United States Patent
Fukumoto et al.

(10) Patent No.: US 8,047,475 B2
(45) Date of Patent: Nov. 1, 2011

(54) FIXING, FIXING STRUCTURE OF FIXING OBJECT, FIXING METHOD FOR FIXING OBJECT, AND METHOD FOR UNFIXING FIXING

(75) Inventors: Mitsuru Fukumoto, Utsunomiya (JP); Yasuhiro Watanabe, Toyota (JP)

(73) Assignee: NIFCO, Inc., Yokohama-shi (JP)

( * ) Notice: Subject to any disclaimer, the term of this patent is extended or adjusted under 35 U.S.C. 154(b) by 318 days.

(21) Appl. No.: 12/244,335

(22) Filed: Oct. 2, 2008

(65) Prior Publication Data
US 2009/0084915 A1    Apr. 2, 2009

Related U.S. Application Data

(63) Continuation of application No. PCT/JP2008/063318, filed on Jul. 24, 2008.

(30) Foreign Application Priority Data

Jul. 26, 2007 (JP) ................................ 2007-195017
Jun. 13, 2008 (JP) ................................ 2008-155329

(51) Int. Cl.
*F16L 3/00* (2006.01)

(52) U.S. Cl. ................ 248/73; 248/222.11; 248/231.81; 24/297; 403/322.1; 403/408.1; 411/508

(58) Field of Classification Search .................... 248/56, 248/71, 74.3, 222.12, 222.13, 222.51, 222.52, 248/223.41, 231.81, 500, 503; 411/22, 24, 411/27, 28, 553, 508; 24/297; 403/225, 403/322.4, 322.1, 408.1
See application file for complete search history.

(56) References Cited

U.S. PATENT DOCUMENTS

| | | | | | |
|---|---|---|---|---|---|
| 3,651,545 | A | * | 3/1972 | Hara | 411/508 |
| 4,527,312 | A | * | 7/1985 | Ruehl et al. | 24/453 |
| 4,579,478 | A | * | 4/1986 | Takahashi | 403/353 |
| 4,674,910 | A | * | 6/1987 | Hayashi | 403/408.1 |
| 4,901,204 | A | * | 2/1990 | Hayashi | 24/297 |
| 4,966,482 | A | * | 10/1990 | Fujimoto | 411/508 |
| 5,615,851 | A | * | 4/1997 | LeBeau | 248/73 |
| 6,394,695 | B1 | * | 5/2002 | Chausset | 248/71 |
| 7,698,788 | B2 | * | 4/2010 | Hansen et al. | 24/297 |
| 7,837,225 | B2 | * | 11/2010 | Gosis et al. | 24/297 |

FOREIGN PATENT DOCUMENTS

| | | |
|---|---|---|
| JP | U-48-052858 | 7/1973 |
| JP | U-52-008774 | 1/1977 |
| JP | A-2000-108781 | 4/2000 |

OTHER PUBLICATIONS

Mar. 30, 2011 Office Action issued in Chinese Patent Application No. 200880100167.8 (with translation).

* cited by examiner

*Primary Examiner* — Tan Le
(74) *Attorney, Agent, or Firm* — Oliff & Berridge, PLC

(57) ABSTRACT

When an insertion portion of a clip is inserted into a through hole and passes through the through hole, lug portions revert toward their original shape, and the top faces of the lug portions are contactable with peripheral edge portions of the through hole. An operation lever is inserted into a fixing hole of a body panel in this state, and after passing through the fixing hole, the operation lever reverts toward its original shape, and the operation lever is contactable to peripheral edge portions of the fixing hole. An operation portion is tilted from this state, and a lock bar is engaged with a lock groove. Movement of the operation lever is thereby restricted, and a housing is fixed to the body panel.

40 Claims, 25 Drawing Sheets

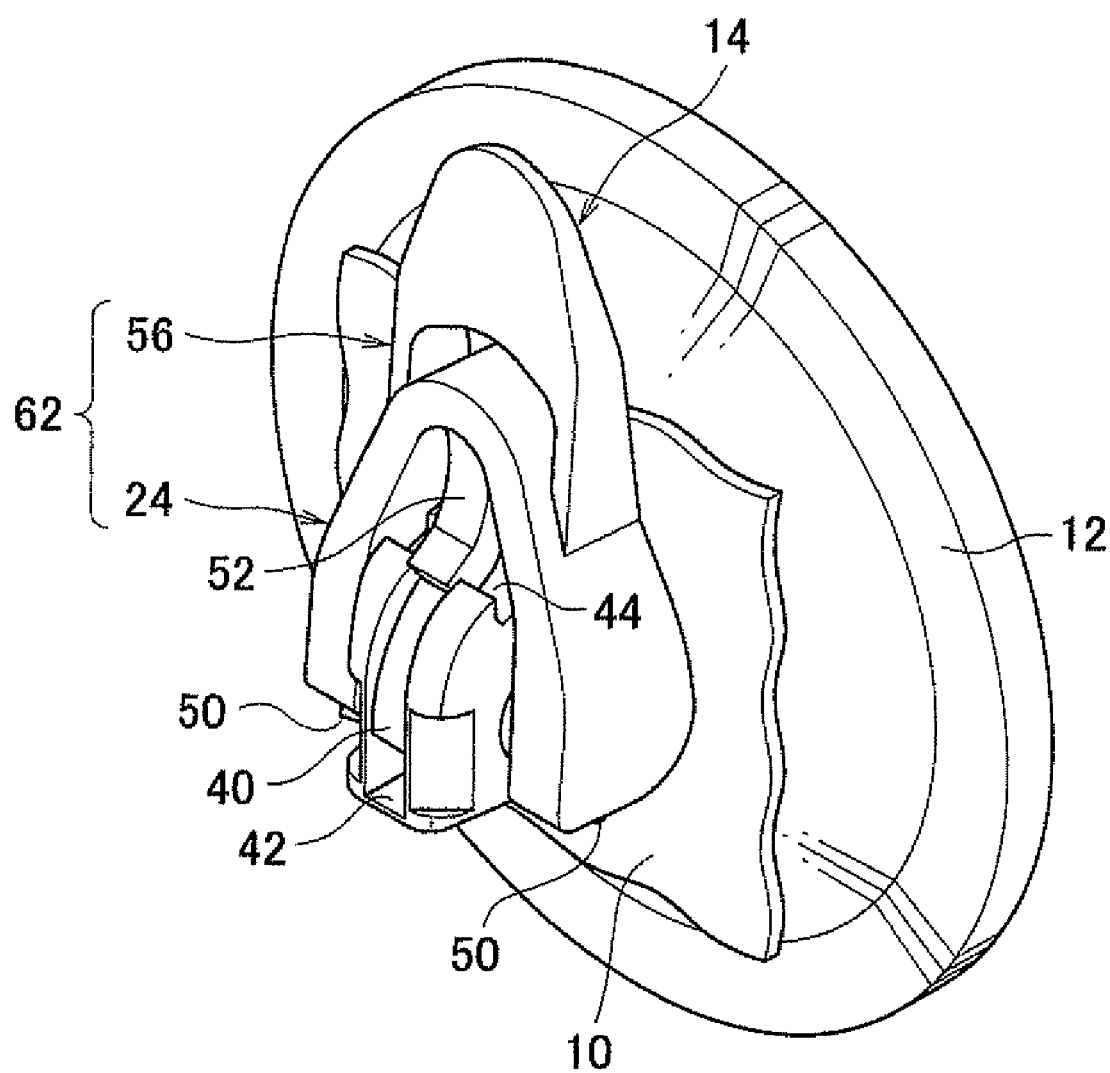

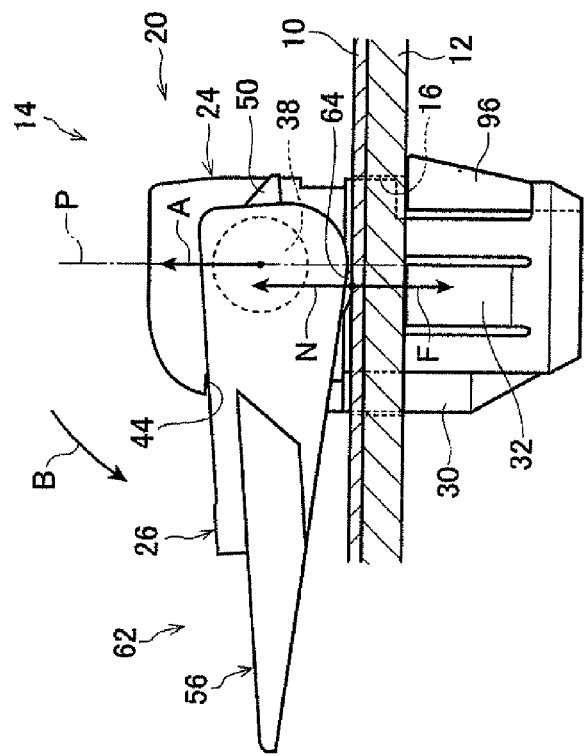
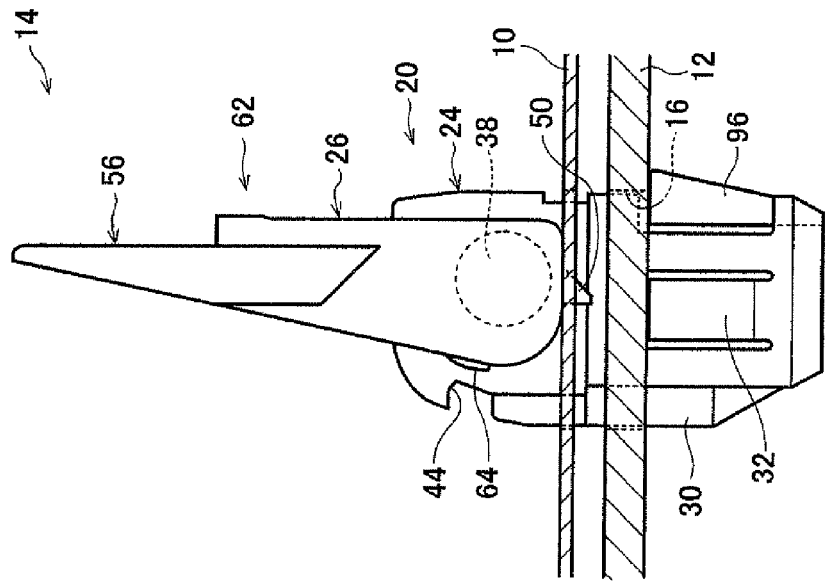
FIG. 22A
FIG. 22B

FIXING, FIXING STRUCTURE OF FIXING OBJECT, FIXING METHOD FOR FIXING OBJECT, AND METHOD FOR UNFIXING FIXING

CROSS-REFERENCE TO RELATED APPLICATIONS

This application is a continuation application of PCT Application No. JP/2008/63318 filed on Jul. 24, 2008, which is incorporated herein by reference in its entirety.

BACKGROUND OF THE INVENTION

1. Technical Field

The present invention relates to a fixing employed when fixing a fixing object to a fixing member, to a fixing structure of a fixing object, to a fixing method for a fixing object, and to a method for unfixing a fixing.

2. Related Art

In order to attach a rear combination lamp to an automobile, for example in Japanese Patent Application Laid-Open No. 2000-108781, first members are attached to respective attachment holes formed at specific positions in a vehicle body panel (body panel), an anchoring frame is formed to the lamp base (rear combination lamp housing), and respective second members are attached to the anchoring frame. The lamp base is then attached to the vehicle body panel by mounting the second members to the first members, however, the number of components is large, and operability is not good.

SUMMARY

In consideration of the above circumstances the subject to be addressed is the provision with fewer components and with good operability of a fixing, a fixing structure of a fixing object, a fixing method for a fixing object, and a method for unfixing a fixing.

A first aspect of the present invention is a fixing for fixing a fixing object to a fixing member by insertion of the fixing into a fixing hole formed in the fixing member and into a fixing object hole formed in the fixing object. The fixing includes: a main body portion to be inserted into the fixing hole and into the fixing object hole; an anchoring portion, formed jutting out from a side face at one end side of the main body portion, inserted through the fixing object hole by radial compression, reverting toward its original shape after passing through the fixing object hole and anchoring onto a peripheral edge portion of the fixing object hole; an operation lever, attached to the other end of the main body portion so as to be capable of tilting, tilting over in a state in which the anchoring portion is anchored onto the peripheral edge portion of the fixing object hole, contacting the fixing member and nipping the fixing member and the fixing object with the anchoring portion; and a lock mechanism that maintains a tilted state of the operation lever.

In the above aspect, the anchoring portion is formed jutting out from a side face at one end side of the main body portion, and the anchoring portion is inserted through the fixing object hole by radial compression. The anchoring portion then reverts toward its original shape after passing through the fixing object hole and anchors onto a peripheral edge portion of the fixing object hole.

The operation lever is attached to the other end of the main body portion so as to be capable of tilting, and when the operation lever is tilted over in a state in which the anchoring portion is anchored onto the peripheral edge portion of the fixing object hole, the operation lever contacts the fixing member, and the fixing member and the fixing object are nipped with the operation lever and the anchoring portion. The tilted state of the operation lever is maintained by the lock mechanism (main fixing).

The fixing object is thereby fixed to the fixing member. Since the fixing object can be fixed to the fixing member with the fixing alone, the number of components is decreased and operability is improved in comparison to conventional configuration.

The operation lever contacts the fixing member in the state in which the operation lever and the anchoring portion nip the fixing member and the fixing object, and due to the operation lever biting into the fixing member side, a pulling-in force (reaction force) acts to pull the clip in, from one end side of the main body portion toward the other end side. The fixing can thereby be used as a substitute for a bolt and nut utilizing this pulling-in force.

The fixing is also capable of fixing the fixing object to the fixing member in a fastened state by simply tilting the operation lever when in the state in which the anchoring portion is anchored onto the peripheral edge portion of the fixing object hole. Assembly by one-touch operation by tilting the operation lever is thereby enabled, without a fastening operation using fasteners or the like, and fixing of the fixing object to the fixing member is performed with certainty and ease.

A second aspect of the present invention is a fixing for fixing a fixing object to a fixing member by insertion of the fixing into a fixing hole formed in the fixing member and into a fixing object hole formed in the fixing object. The fixing of this aspect includes: a main body portion to be inserted into the fixing hole and into the fixing object hole; a retaining portion, provided at a side face at one end side of the main body portion and retained at a peripheral edge portion of the fixing object hole after passing through the fixing object hole; an operation lever, attached to the other end of the main body portion so as to be capable of tilting, tilting over in a state in which the retaining portion is retained at the peripheral edge portion of the fixing object hole, contacting the fixing member, and nipping the fixing member and the fixing object with the retaining portion; and a lock mechanism that maintains a tilted state of the operation lever.

The anchoring portion is provided to the main body portion in the first aspect, so that the anchoring portion is elastically deformed and anchored onto the peripheral edge portion of the fixing object hole. However in the second aspect, for example, a retaining portion of a protrusion or indentation is provided to the main body portion, and a cut-out portion or an extension portion is provided to the hole wall of the fixing object hole, which allows the retaining portion to pass through.

In this manner the main body portion is retained by the peripheral edge portion of the fixing object hole or by the extension portion after the retaining portion has passed the cut-out portion or the extension portion. Consequently there is no need to provide an elastically deformable portion such as the anchoring portion to the main body portion.

In the second aspect, configuration may be made with the retaining portion formed as a retaining rib along the direction of insertion of the main body portion into the fixing object hole, and with the retaining rib retained at the peripheral edge portion of the fixing object hole by rotation of the main body portion after an end face of the retaining rib has passed the cut-out portion formed to the hole wall of the fixing object hole.

In the above configuration, the retaining rib is formed, as the retaining portion, to the main body portion along the insertion direction of the main body portion. The cut-out portion is therefore provided in the hole wall of the fixing object hole enabling the retaining rib to pass therethrough. The main body portion is rotated after the end face of the retaining rib has passed through, and the retaining rib and the peripheral edge portion of the fixing object hole oppose each other, retaining the main body portion at the peripheral edge portion of the fixing object hole.

A third aspect of the present invention is a fixing for fixing a fixing object to a fixing member. The fixing of this aspect includes: a main body portion provided to the fixing member for insertion into a fixing object hole formed in the fixing object; an operation lever, attached to the main body portion so as to be capable of tilting, tilting over and contacting a peripheral edge portion of the fixing object hole, the operation lever and the fixing member nipping the fixing object; and a lock mechanism that maintains a tilted state of the operation lever.

In the third aspect, the main body portion is provided to the fixing member, and hence rendering unnecessary an assembly process, as in the first and second aspects, to assemble the main body portion to the fixing member.

A fourth aspect of the present invention is a fixing for fixing a fixing object to a fixing member. The fixing of this aspect includes: a main body portion provided to the fixing object for insertion into an fixing hole formed in the fixing member; an operation lever, attached to the main body portion so as to be capable of tilting, tilting over and contacting a peripheral edge portion of the fixing hole, the operation lever and the fixing object nipping the fixing member; and a lock mechanism that maintains a tilted state of the operation lever.

In the fourth aspect, the main body portion is provided to the fixing object, and hence rendering unnecessary an assembly process, as in the first and second aspects, to assemble the main body portion to the fixing object.

In the first aspect to the fourth aspect, the operation lever may form substantially a U-shape, with the operation lever made capable of tilting by pins that are provided to both end portions of the operation lever and engage with shaft a hole provided in the main body portion.

In the above configuration, the operation lever is formed substantially as a U-shape, and pins are provided at both ends of the operation lever. The main body portion is also provided with a shaft hole, and the operation lever is made capable of tilting by the pins of the operation lever engaging with the shaft hole.

In the above aspects, a pressing portion may be provided to an axial portion of the operation lever for pressing the fixing member or the fixing object in a locked state in which the tilted state of the operation lever is maintained by the lock mechanism.

By the above configuration, the pressing portion is provided to an axial portion of the operation lever, and by the pressing portion pressing the fixing member or the fixing object in the locked state in which the tilted state of the operation lever is maintained, the pressing portion bites into the fixing member side or the fixing object side so that a pulling-in force toward the fixing member acts on the clip.

In the above aspects, the operation lever may be formed from an elastic member, so as to be widthwise compressed and inserted into the fixing hole or the fixing object hole, and to revert toward its original shape after passing through the fixing hole or the fixing object hole.

In the above configuration the operation lever is formed from an elastic member and widthwise compressed and inserted into the fixing hole or the fixing object hole. The operation lever thereby reverts toward its original shape as the operation lever passes through the fixing hole or through the fixing object hole, an arrangement is achieved in which the fixing member and the fixing object are disposed between the operation lever and the anchoring portion, the fixing is in a retained state (temporary fixing).

Namely, since this fixing has capability for both temporary fixing and main fixing, there is no need for a separate member for temporary fixing the fixing, enabling the number of configured components to be reduced, and achieving fixing without a fastener. It is also possible to preassemble the fixing to the fixing member.

In the first aspect to the fourth aspect, the lock mechanism may be configured with an engaging portion provided to the operation lever or to the main body portion, and with a lock groove provided to the main body portion or to the operation lever with which the engaging portion engages, and maintaining a tilted state of the operation lever that has been tilted.

In the above configuration, the engaging portion is provided to the operation lever (or to the main body portion) and a lock groove is provided to the main body portion (or to the operation lever) to be engaged by the engaging portion, such that the tilted state of the operation lever is maintained in the state in which the engaging portion is engaged with the lock groove.

In the above configuration, the engaging portion may be provided to the operation lever, and an engaged portion provided to the main body portion and engaged by the engaging portion to stand the operation lever upright along the axial direction of the main body portion.

In the above configuration, the engaging portion is provided to the operation lever, and an engaged portion is provided to the main body portion and engaged by the engaging portion to stand the operation lever upright along the axial direction of the main body portion. Operation is facilitated by standing the operation lever upright, since the operation lever can be stopped from tilting when the operation lever is being inserted into the fixing hole.

In the first aspect to the fourth aspect, a centering mechanism may be provided to the operation lever, the centering mechanism contacting the hole wall of the fixing hole or the fixing object hole when the operation lever is in an upright state, and setting the central position of the main body portion relative to the fixing hole or the fixing object hole.

In the above configuration the centering mechanism is provided to the operation lever such that the centering mechanism contacts the hole wall of the fixing hole or the fixing object hole when the operation lever is in an upright state. The central position of the main body portion can be set in this manner relative to the fixing hole or the fixing object hole.

By configuring such that the centering mechanism contacts the hole wall of the fixing hole or the fixing object hole when the operation lever is in a widthwise compressed state, the fixing is held while the centering mechanism being in a taut state, enabling centering to be ensured of the fixing relative to the fixing hole or the fixing object hole.

In the first aspect to the fourth aspect, configuration may be made such that a locked state in which the engaging portion is locked in the lock groove so that the tilted state of the operation lever is maintained is unlocked by the engaging portion moving in a direction intersecting with the tilting direction of the operation lever.

By the above configuration, the engaging portion is unlocked from the lock groove simply by changing the position of the operation lever to which the engaging portion is provided.

In the first aspect to the fourth aspect, a return groove may be provided connecting the engaged portion and the lock groove, for the engaging portion to pass along from the lock groove up to the engaged portion.

In the above configuration, the return groove is provided connecting the engaged portion and the lock groove, for the engaging portion to pass along from the lock groove up to the engaged portion. The engaging portion passes along one path from the engaged portion up to the lock groove when the engaging portion is locked in the lock groove, and passes along another path (return groove) from the lock groove up to the engaged portion after the engaging portion has been unlocked from the lock groove.

By so doing, when the engaging portion is unlocked from the locked state, there is no need to pass along the path for locking the engaging portion with the lock groove, and the engagement force exerted when the engaging portion is in the locked state in the lock groove can be made independent from the engagement release force when the leading end portion of the engaging portion is unlocked from the lock groove. This therefore enables the engagement force of the engaging portion with the lock groove to be made large, while the engagement release force of the engaging portion from the lock groove is made small.

In the first and second aspects, a restricting portion may be provided positioned at one end side of the main body portion, contacting the fixing object and restricting tilting of the main body portion in the operation lever tilting direction.

When the operation lever is tilted in a state in which the anchoring portion or the retaining portion is anchored onto a peripheral edge portion of the fixing object hole, the operation lever contacts the fixing member, nips the fixing member and the fixing object together with the anchoring portion or the retaining portion. By the provision of the restricting portion for restricting tilting of the main body portion in the above configuration, the restricting portion contacts a peripheral edge portion of the fixing object hole when the operation lever is tilted, and tilting of the main body portion is restricted. This enables attainment of a locked state of the operation lever to be ensured. It should be noted that the anchoring portion may also serve as the restricting portion.

In the second exemplary embodiment, the restricting portion also serves as the retaining portion.

There is no requirement to provide a separate retaining portion in the above configuration, since the restricting portion also serves as the retaining portion.

A fifth aspect of the present invention is a fixing structure of a fixing object for fixing the fixing object to a fixing member.

Substantially the same effects may be obtained by the above aspect as obtained in the first aspect to the fourth aspect.

A sixth aspect of the present invention is a fixing method for fixing a fixing object to a fixing member, the method including: a first insertion process of inserting the anchoring portion of the fixing into a fixing object hole in the first aspect and passing the anchoring portion therethrough; a second insertion process performed after carrying out the first insertion process and including inserting the operation lever of the fixing into the fixing hole and passing the operation lever therethrough; and a fixing process performed after carrying out the second insertion process and including tilting the operation lever and nipping the fixing member and the fixing object with the anchoring portion, fixing the fixing object to the fixing member.

In the above aspect, in the first insertion process, the anchoring portion of the fixing is inserted through a fixing object hole and passes therethrough, and in the second insertion process performed after carrying out the first insertion process, the operation lever of the fixing is inserted into the fixing hole and passes therethrough. The fixing member and the fixing object can thereby be disposed between the operation lever and the anchoring portion.

Then in the fixing process, when the operation lever is tilted, the fixing member and the fixing object are nipped with the operating lever and the anchoring portion, enabling the fixing object to be fixed to the fixing member (main fixing).

In the sixth aspect of the present invention, the main body portion of the fixing is temporarily fixed to the fixing object in the first insertion process.

By the above configuration, the main body portion of the fixing can be temporarily fixed to the fixing object in the first insertion process. Temporary fixing is thereby provided separately to the fixing process (main fixing). By providing independent processes of the temporary fixing and the main fixing, a reduction in the number of configured components and reduction in fastening tools is enabled.

A seventh aspect of the present invention is a method for unfixing the fixing of the first aspect and includes: a tilt state unlocking process for unlocking a tilted state of the operation lever; an operation lever uprighting process performed after carrying out the tilt state unlocking process and including rotating the operation lever and standing the operation lever upright; and an operation lever pull-out process performed after carrying out the operation lever uprighting process and including pulling the operation lever out from the fixing hole or the fixing object hole.

In the above aspect, after unlocking the tilted state of the operation lever in the tilt state unlocking process, the operation lever is rotated and made upright in the operation lever uprighting process. In the operation lever pull-out process the operation lever is pulled out from the fixing hole or the fixing object hole, and the fixing member is separated from the fixing object.

Due to the above configurations, the number of components is reduced, with good operability when fixing the fixing object to the fixing member.

BRIEF DESCRIPTION OF THE DRAWINGS

FIG. 9 is a perspective view showing a state in which a housing has been fixed to a body panel using a clip according to the first exemplary embodiment of the present invention;

FIG. 22A is a side view of a clip according to the third exemplary embodiment of the present invention, showing a state in which the clip has been inserted into a fixing hole in a body panel;

FIG. 22B is a side view of a clip according to the third exemplary embodiment of the present invention, showing a state in which a housing has been fixed to a body panel using the clip;

DESCRIPTION

Explanation will now be given of a clip according to a first exemplary embodiment of the present invention, with reference to the drawings.

Figure 1:
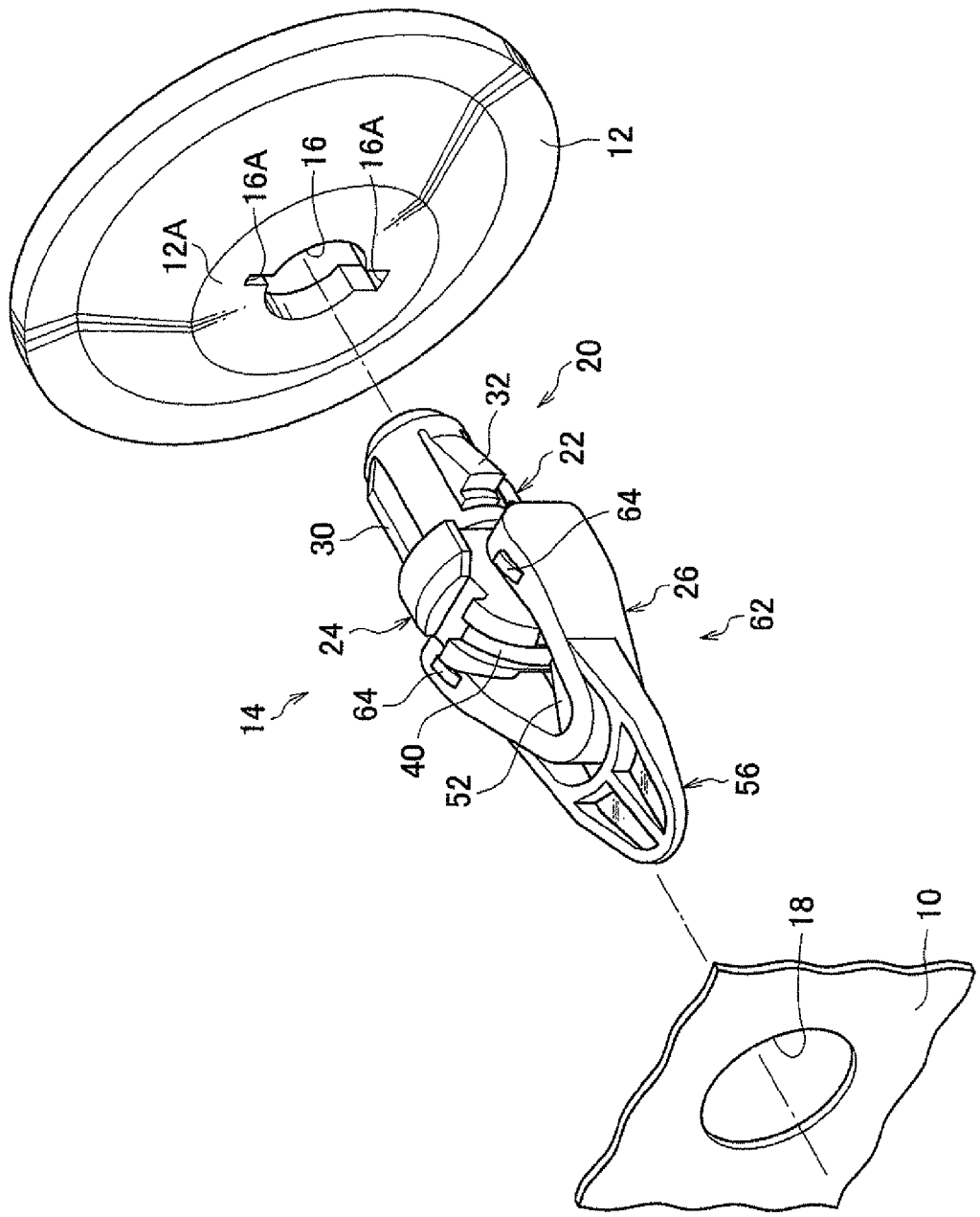
FIG. 1 is an exploded perspective view showing a housing fixing structure employing a clip according to a first exemplary embodiment of the present invention.

As shown in FIG. 1, a housing (fixing object) 12, such as for a combination lamp, is to be fixed to a body panel (fixing member) 10, and the housing 12 is fixed to the body panel 10 with a clip (fixing) 14.

The housing 12 forms in a substantially circular conical base shape, with a flat face 12A at a central portion thereof, and a through hole 16 (fixing object hole) formed through the central portion of the flat face 12A. A pair of cut-out portions 16A are disposed at mutually opposing positions in the through hole 16. To attach the housing 12 to the body panel 10 a fixing hole 18 is formed in the body panel 10 at a position corresponding to the through hole 16 of the housing 12.

Figure 2:
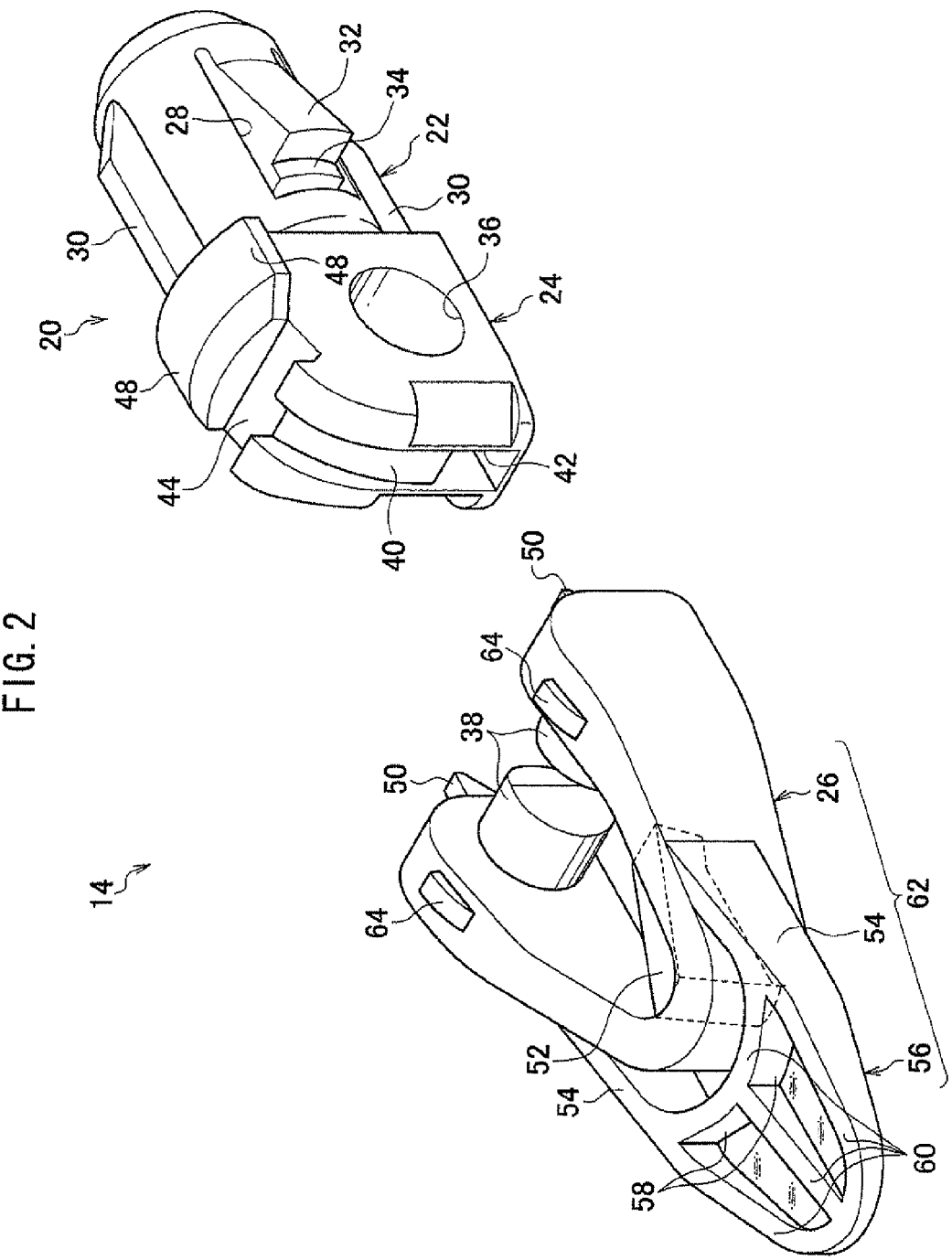
FIG. 2 is an exploded perspective view showing a clip according to the first exemplary embodiment of the present invention.
Figure 3:
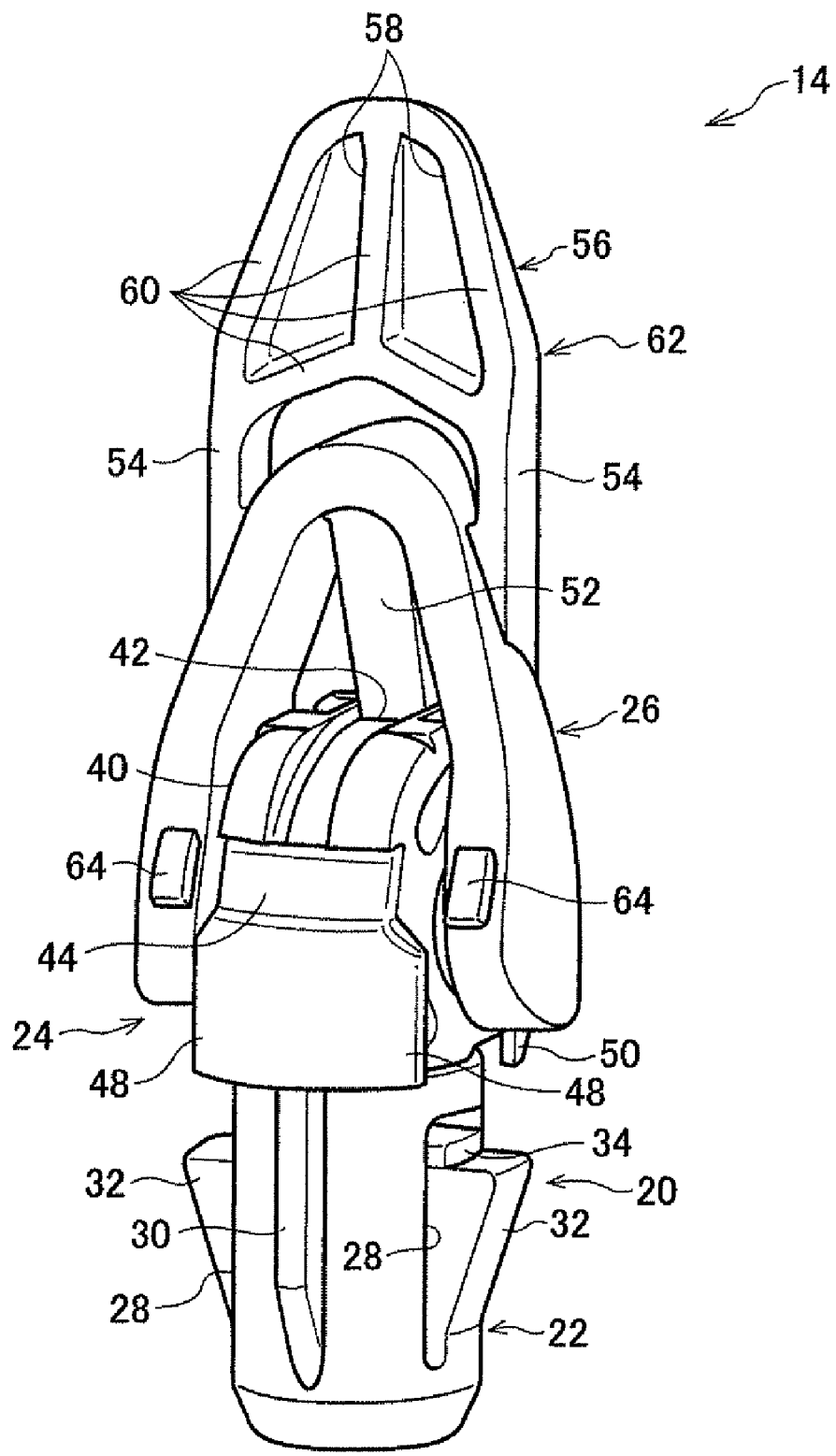
FIG. 3 is a perspective view showing a clip according to the first exemplary embodiment of the present invention.

As shown in FIG. 1 to FIG. 3, the clip 14 is molded from a resin and is provided with a main body portion (main body) 20, configured to include: an insertion portion 22, of a substantially circular cylindrical shape that is insertable into the through hole 16 of the housing 12; and a shaft portion 24, of substantially rectangular pillar shape provided at the opposite end of the main body portion 20 to that of the insertion portion 22. The shaft portion 24 is formed so that an operation lever 26 can be attached thereto in a tiltable manner. For ease of explanation the shaft portion 24 side will be referred to as the upper portion, and the insertion portion 22 side will be referred to as the lower portion.

The insertion portion 22 is of a size capable of insertion into the through hole 16 of the housing 12. A pair of positioning ribs 30 are formed to the outer peripheral face of the insertion portion 22, the positioning ribs 30 being substantially rectangular in cross-section and capable of insertion into the cut-out portions 16A of the through hole 16.

The orientation of the clip 14 relative to the housing 12 is determined by positional alignment of the positioning ribs 30 in the cut-out portions 16A. For ease of explanation the sides formed with the positioning ribs 30 are referred to as the front and rear faces of the insertion portion 22 (main body portion 20). It should be noted that the shape of the positioning ribs 30 is different depending on the shape of the cut-out portions 16A.

Lug portions (anchoring portions) 32 protrude out toward the outside from the side faces of the insertion portion 22. The lug portions 32 are formed substantially triangular shaped in cross-section, with the top face of the lug portions 32 substantially orthogonal to the axial line P of the insertion portion 22. Incision portions 28 are formed as substantially inverted U-shapes around the periphery of the lug portions 32, such that the top face sides of the lug portions 32 are free ends, with the lug portions 32 capable of compression in the radial direction, pivoting about base portions of the lug portions 32.

Circular arced ribs 34 are also provided protruding upward from the top face of the lug portions 32, the arced ribs 34 having an outer peripheral face of substantially the same diameter as the outer peripheral face of the insertion portion 22. The arced ribs 34 are disposed within the through hole 16 and are contactable with the hole wall of the through hole 16 of the housing 12, in a state in which the lug portions 32 are engaged with the housing 12 holding the lug portions 32 (see FIG. 6).

A through hole 36 is formed in the shaft portion 24, passing through the side faces of the shaft portion 24. The through hole 36 is capable of being inserted into by later described shafts (pins) 38 that are provided to the operation lever 26. A guide groove 40 is provided at the center in the width direction of the shaft portion 24, from the top face of the shaft portion 24 across a central portion thereof to the front face side, the guide groove 40 having a convex shaped circular arced face when viewed from the side (see FIG. 4).

An engagement hole (engaged portion) 42 of substantially rectangular block shape is provided indented into a top end portion of the guide groove 40. There is also a lock groove (lock mechanism) 44 provided indented into a lower end portion of the guide groove 40, the lock groove 44 being orthogonal to the guide groove 40 and indented to form a lower step than the guide groove 40. Protruding portions 48 are provided overhanging out from the side faces of the shaft portion 24 at both sides of a front wall 46 of the shaft portion 24 positioned at lower portions of the lock groove 44.

The operation lever 26 for fining to the through hole 36 forms substantially a U-shape, with the shafts 38 provided protruding out toward each other from both internal side faces of the operation lever 26. The shafts 38 are inserted within the through hole 36, and the operation lever 26 is tiltable with respect to the shaft portion 24 via the shafts 38.

One or other of the shafts 38 or the through hole 36, are formed with an elliptical shape, and the clearance between the shafts 38 and the shaft portion 24 varies according to the tilt angle of the operation lever 26, with minimum clearance therebetween when the operation lever 26 is in the locked position.

A gap is provided between one of the shafts 38 and the other, such that operation lever 26 can be compressed widthwise. The operation lever 26 is insertable in the fixing hole 18 of the body panel 10 when in a state of widthwise compression.

Figure 7:
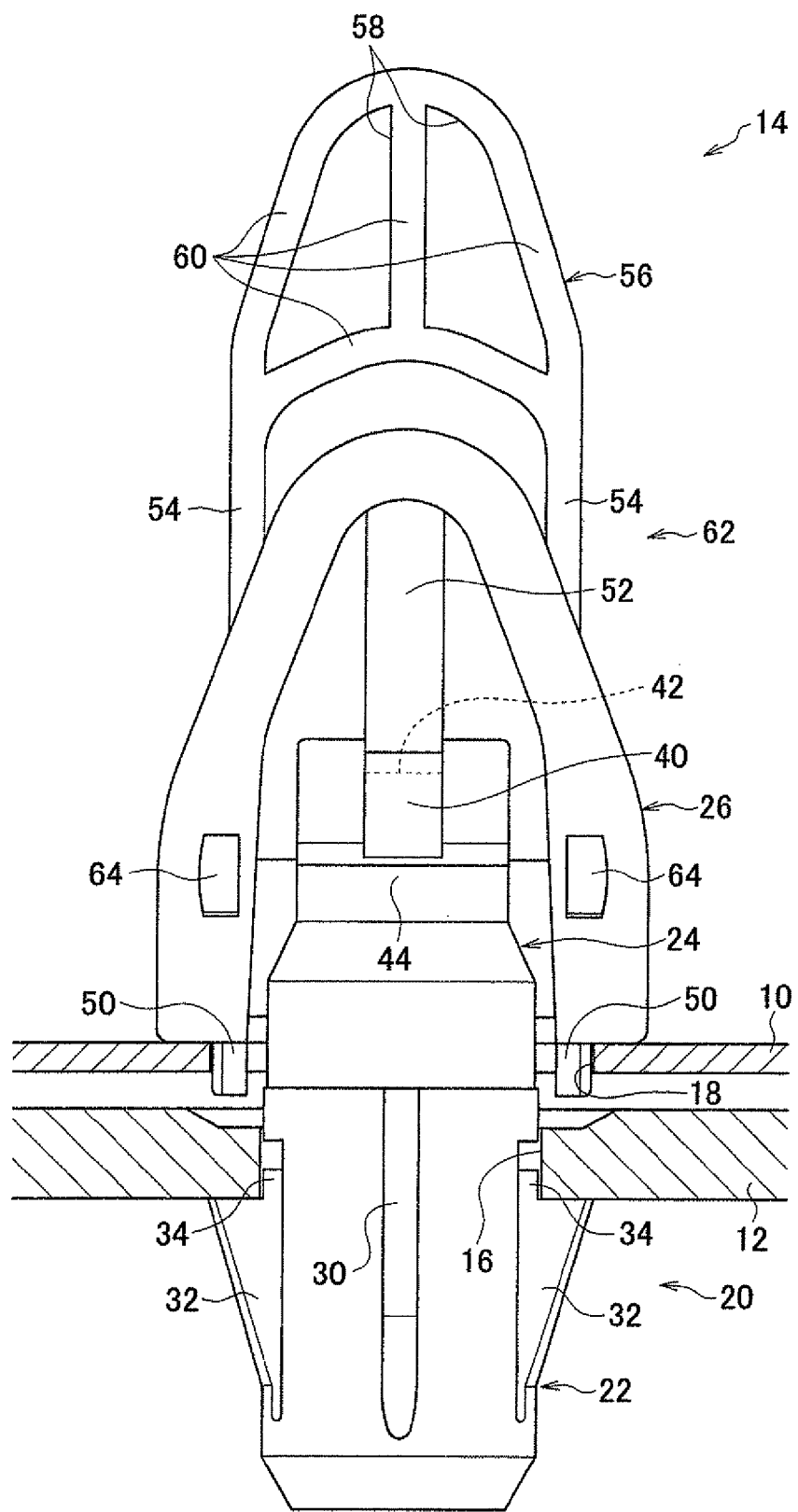
FIG. 7 is a front view of a clip according to the first exemplary embodiment of the present invention, showing a state in which the clip has been inserted into a fixing hole in a body panel.

The operation lever 26 is wider than the hole size of the through hole 16 of the housing 12 (see FIG. 7). The above gap is of a necessary amount for widthwise compression of the operation lever 26 for insertion into the fixing hole 18, with the length of engagement of the shafts 38 with the shaft portion 24 set as large as possible, such that the shafts 38 do not readily come out of the shaft portion 24.

Centering ribs (centering mechanism) 50 is provided at substantially the center of both end portions of the operation lever 26 and is set so as to extend over the shaft portion 24 toward the main body 22 when aligned along the axial direction of the shaft portion 24, as shown in FIG. 7. Consequently, the centering ribs 50 are contactable with the hole wall of the fixing hole 18 when the operation lever 26 is in a state of insertion into the fixing hole 18 of the body panel 10.

Figure 4:
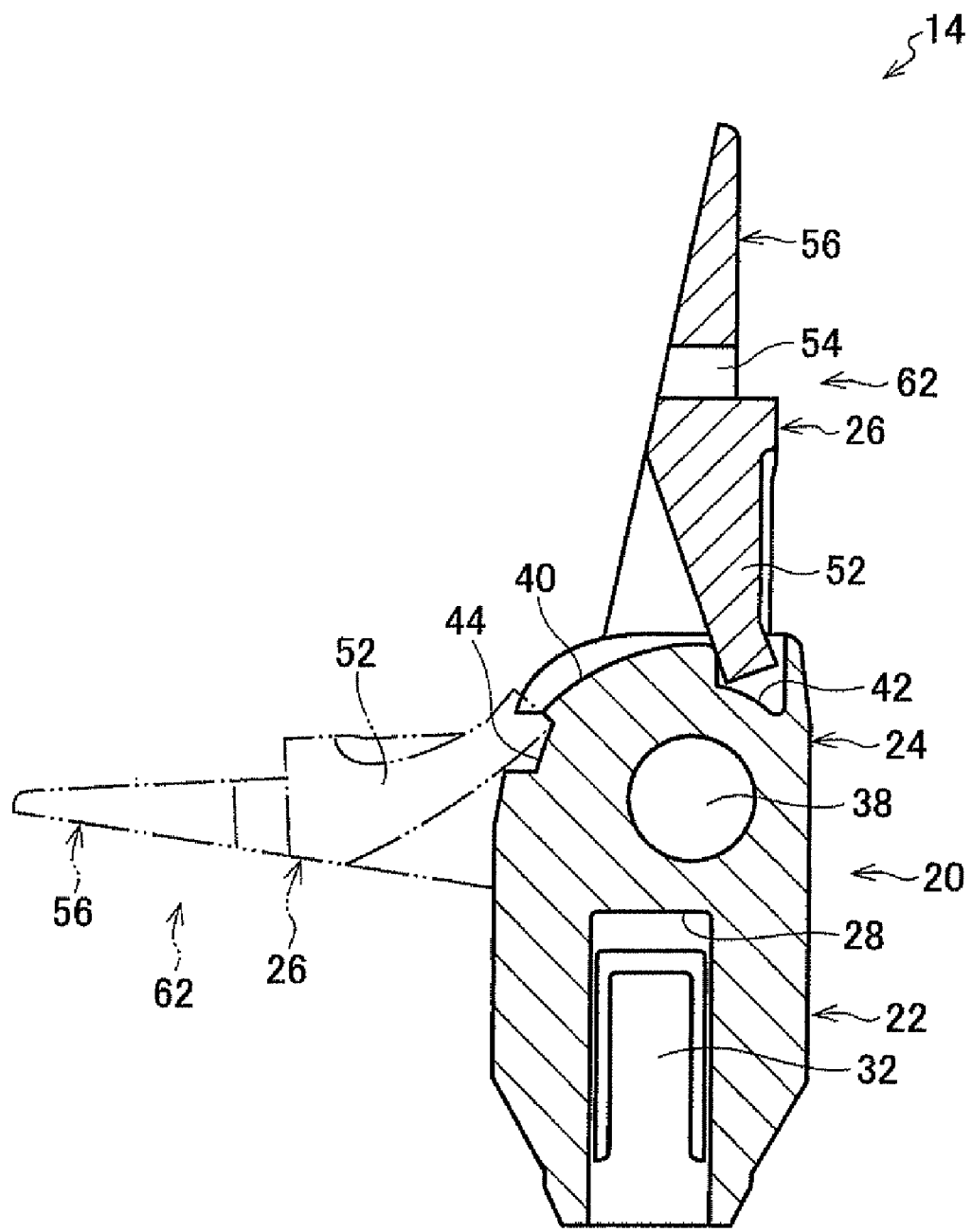
FIG. 4 is cross-section for explanation of the operation of a clip according to the first exemplary embodiment of the present invention.

A substantially rectangular column shaped lock bar 52 is provided extending out toward the inside from the free end portion of the operation lever 26, as shown in FIG. 3 and FIG. 4, extending at an inclined angle downward toward the rear of the operation lever 26. The lock bar (engaging portion) 52 is capable of engagement and disengagement with the engagement hole 42, and the operation lever 26 maintains an upright state (see FIG. 3) when the lock bar 52 is in the engaged state with the engagement hole 42.

The lock bar 52 is movable within the guide groove 40, and the engagement of the lock bar 52 with the engagement hole 42 is released when the operation lever 26 is tilted further than the upright state of the operation lever 26, and the lock bar 52 moves along the guide groove 40.

The lock bar 52 is capable of engagement and disengagement with the lock groove 44, and movement of the lock bar 52 is limited in a state of engagement with the lock groove 44, locking the operation lever 26 (state shown by the broken lines in FIG. 4).

The force required to release the engaged state of the lock bar 52 with the lock groove 44 is set so as to be greater than the force required to release the engaged state of the lock bar 52 with the engagement hole 42. Consequently the operability of the operation lever 26 is improved and maintenance of the locked state by the operation lever 26 is ensured.

A pair of extending portions 54 are provided extending out from the outer face at the free end side of the operation lever 26 toward the opposite side to that of the centering ribs 50, lengthening the operation lever 26 by protruding out from the free end thereof. An operation portion 56 is provided connecting together end portions of the extending portions 54, the operation portion 56 forming a substantially triangular shape.

The operation lever 26 is tilted by pressing the operation portion 56. Thinned portions 58 are provided partitioning the central portion of the operation portion 56, indented as substantially triangular shapes such that the operation portion 56 does not catch after molding. Also, by forming the thinned portions 58 there are ribs 60 formed at the peripheral edge portions of the thinned portions 58, thereby increasing the rigidity of the operation portion 56.

The operation lever 26 is elastically deformable, however, problems would occur with operability if the operation portion 56 were to readily elastically deform when tilting the operation lever 26, and so the rigidity of the operation portion 56 is set high, improving the operability. By extending the operation portion 56 out from the operation lever 26 the length of an operation member 62 (the operation lever 26 and the operation portion 56) is lengthened, giving good operability.

Figure 8A:
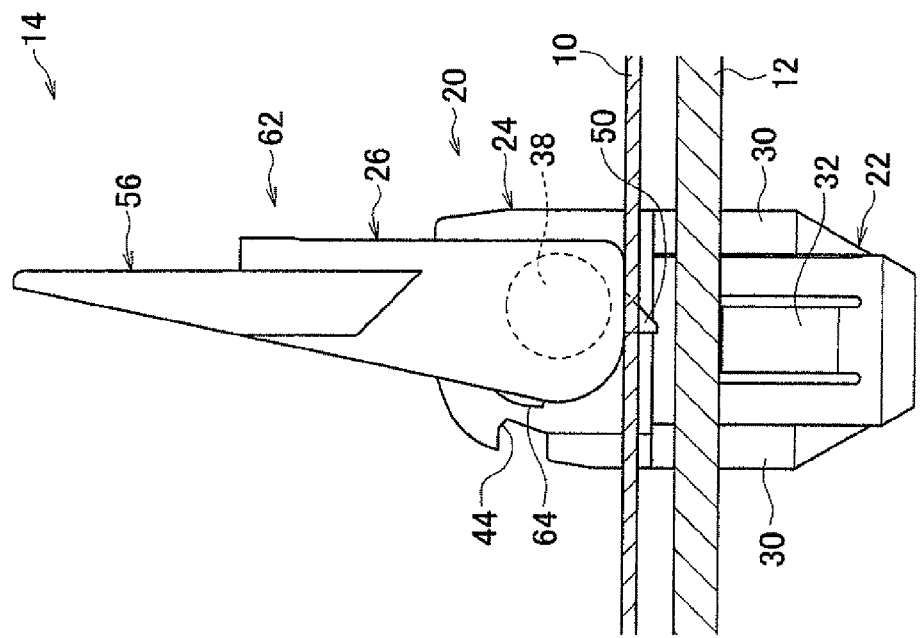
FIG. 8A is a side view of FIG. 7.
Figure 8B:
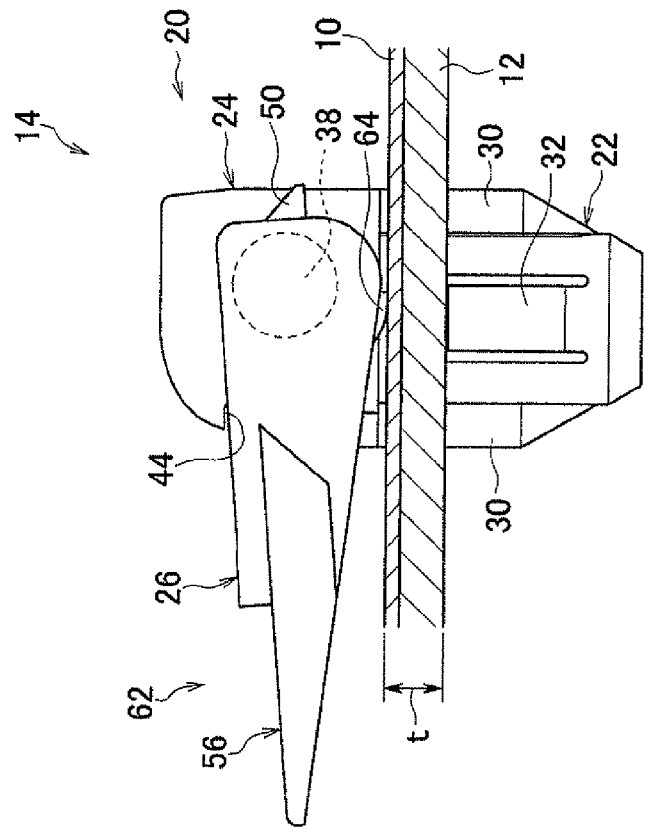
FIG. 8B is a side view showing a state in which a housing has been fixed to a body panel using a clip according to the first exemplary embodiment of the present invention.

Pressing portions 64 are provided protruding out from the front surface at the shaft 38 side of the operation lever 26. The lug portions 32 of the insertion portion 22 pass through the through hole 16, the operation lever 26 has passed through the fixing hole 18 as shown in FIG. 8A, and in the state in which the operation lever 26 is tilted as shown in FIG. 8B, configuration is made such that the distance between the top faces of the lug portions 32 and the pressing portions 64 of the operation lever 26 becomes less than the combined thickness (t) of the body panel 10 and the housing 12.

Consequently, when the operation lever 26 is tilted, the pressing portions 64 of the operation lever 26 contact the body panel 10 in the engaged (locked) state of the lock bar 52 in the lock groove 44. The pressing portions 64 and the top faces of the lug portions 32 nip the body panel 10 and the housing 12. The housing 12 is thereby fixed to the body panel 10 (see FIG. 9).

Operation of the clip according to the first exemplary embodiment of the present invention will now be explained.

The lock bar 52 of the operation lever 26 of the clip 14 is first engaged with the engagement hole 42, as shown in FIG. 4, and the insertion portion 22 is inserted into the through hole 16 by positioning the positioning ribs 30, as shown in FIG. 1, of the insertion portion 22 of the clip 14 in the cut-out portions 16A of the through hole 16 with the operation lever 26 in the upright state.

Figure 5:
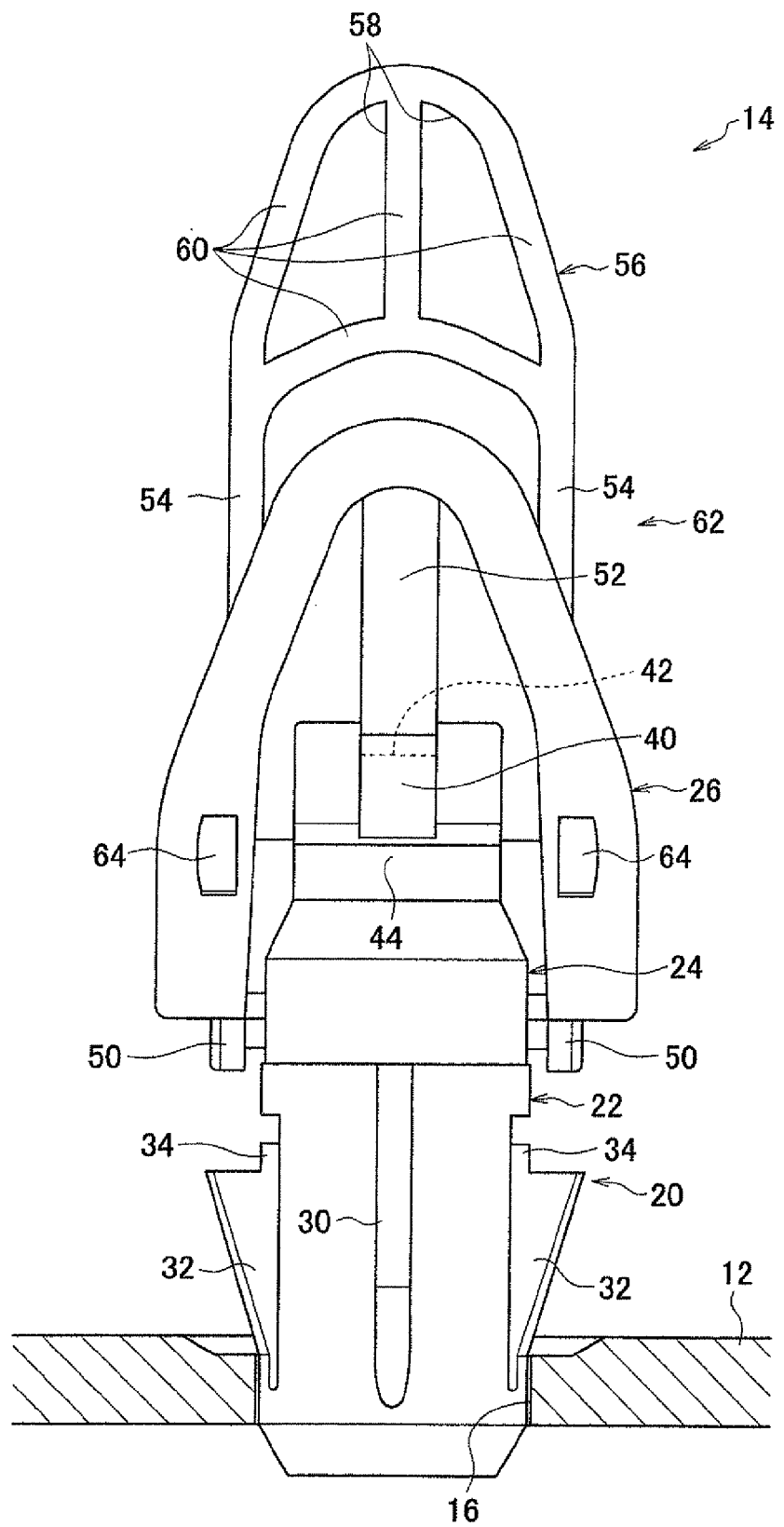
FIG. 5 is a front view of a clip according to the first exemplary embodiment of the present invention, showing a state in which the clip is being inserted into a through hole in a housing.
Figure 6:
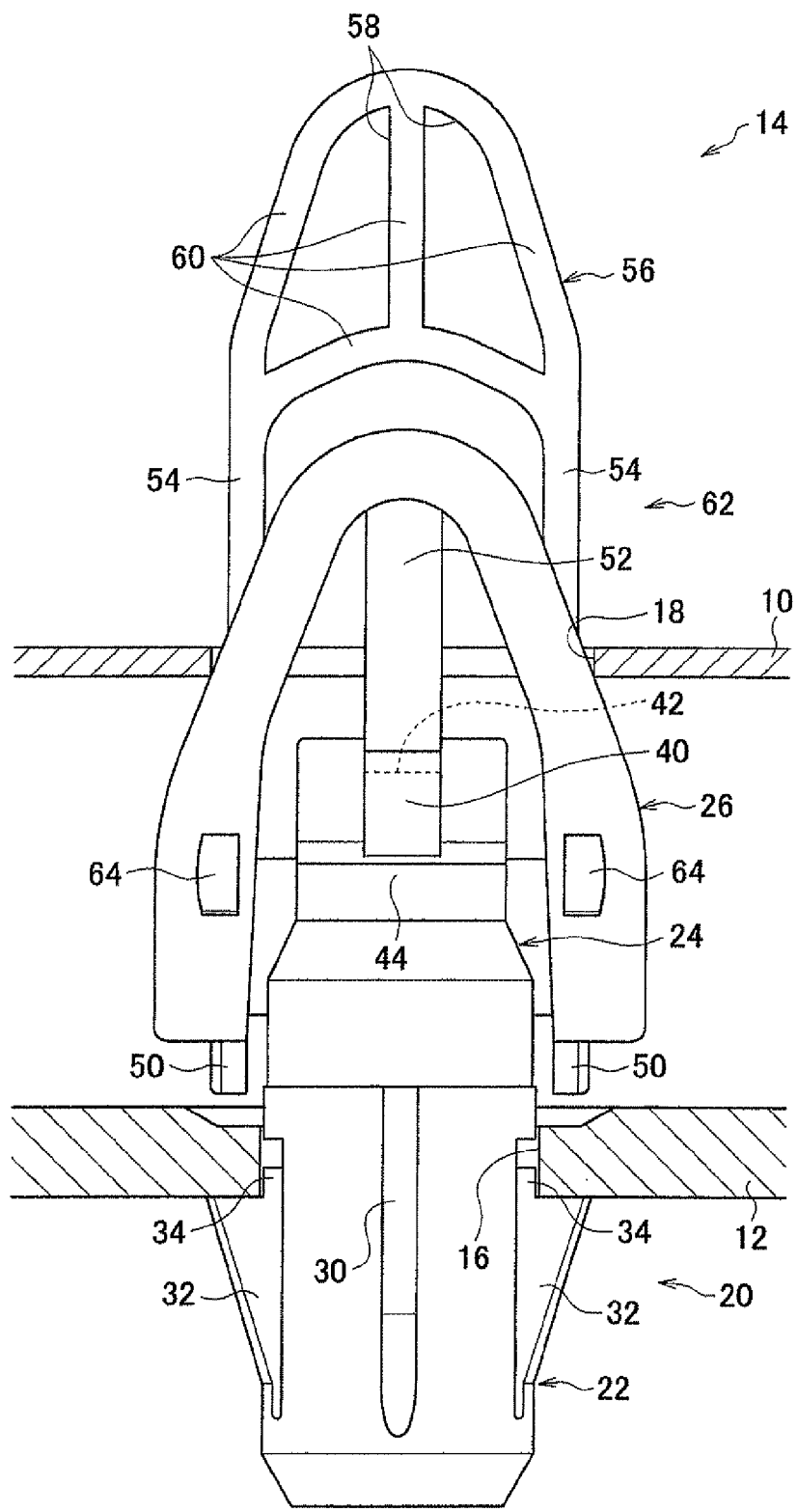
FIG. 6 is a front view of a clip according to the first exemplary embodiment of the present invention, showing a state in which a clip that is temporarily fixed to a housing is being inserted into a fixing hole in a body panel.

The clip 14 is pressed in the state shown in FIG. 5, radially compressing the lug portions 32 of the insertion portion 22 with the internal edge portions of the through hole 16. The insertion portion 22 thereby becomes insertable in the through hole 16. When the lug portions 32 have been inserted through the through hole 16, as shown in FIG. 6, the lug portions 32 revert toward their original shape, and the top faces of the lug portions 32 are contactable with a peripheral edge portion of the through hole 16 (first insertion process). The circular arced ribs 34 are also disposed at the inside of the through hole 16 and are retained within the through hole 16.

In this state, that is to say the housing 12 is disposed between the lug portions 32 and the operation lever 26, and the clip 14 is temporarily fixed to the housing 12 (temporary fixing process).

The operation lever 26 is next inserted through the fixing hole 18 of the body panel 10. The clip 14 is pressed in the state shown in FIG. 6, and the operation lever 26 is widthwise compressed by the internal edge portions of the fixing hole 18. The operation lever 26 thereby becomes insertable in the fixing hole 18.

When the operation lever 26 has passed through the fixing hole 18, as shown in FIG. 7, the operation lever 26 reverts toward its original shape, and the operation lever 26 is contactable with a peripheral edge portion of the fixing hole 18 (second insertion process). The centering ribs 50 are in contact with the hole wall of the fixing hole 18 in this state, positioning the clip 14 with respect to the axial center of the fixing hole 18.

By configuring such that the centering ribs 50 contact the hole wall of the fixing hole 18 while the operation lever 26 is compressed in the widthwise, the clip 14 is held in a state in which the centering ribs 50 push outward, enabling centering of the clip 14 to be ensured relative to the fixing hole 18.

From this state, as shown in FIG. 4, the operation lever 26 is tilted along the guide groove 40. When this occurs the engaged state of the engagement hole 42 with the lock bar 52 is disengaged, the operation lever 26 becomes tiltable, and the lock bar 52 is moved along the guide groove 40. The operation lever 26 is tilted up to the point where the lock bar 52 is engaged with the lock groove 44.

Movement of the operation lever 26 is restricted by engagement of the lock bar 52 with the lock groove 44, as shown in FIG. 8B, and the body panel 10 and the housing 12 are nipped between the upper faces of the lug portions 32 of the insertion portion 22 and the pressing portions 64 of the operation lever 26, fixing the housing 12 to the body panel 10 (fixing process). Since the housing 12 can be fixed to the body panel 10 by the clip 14 alone, a reduction in the number of components is enabled in comparison with conventional configuration, and operability is also good.

Figure 10:
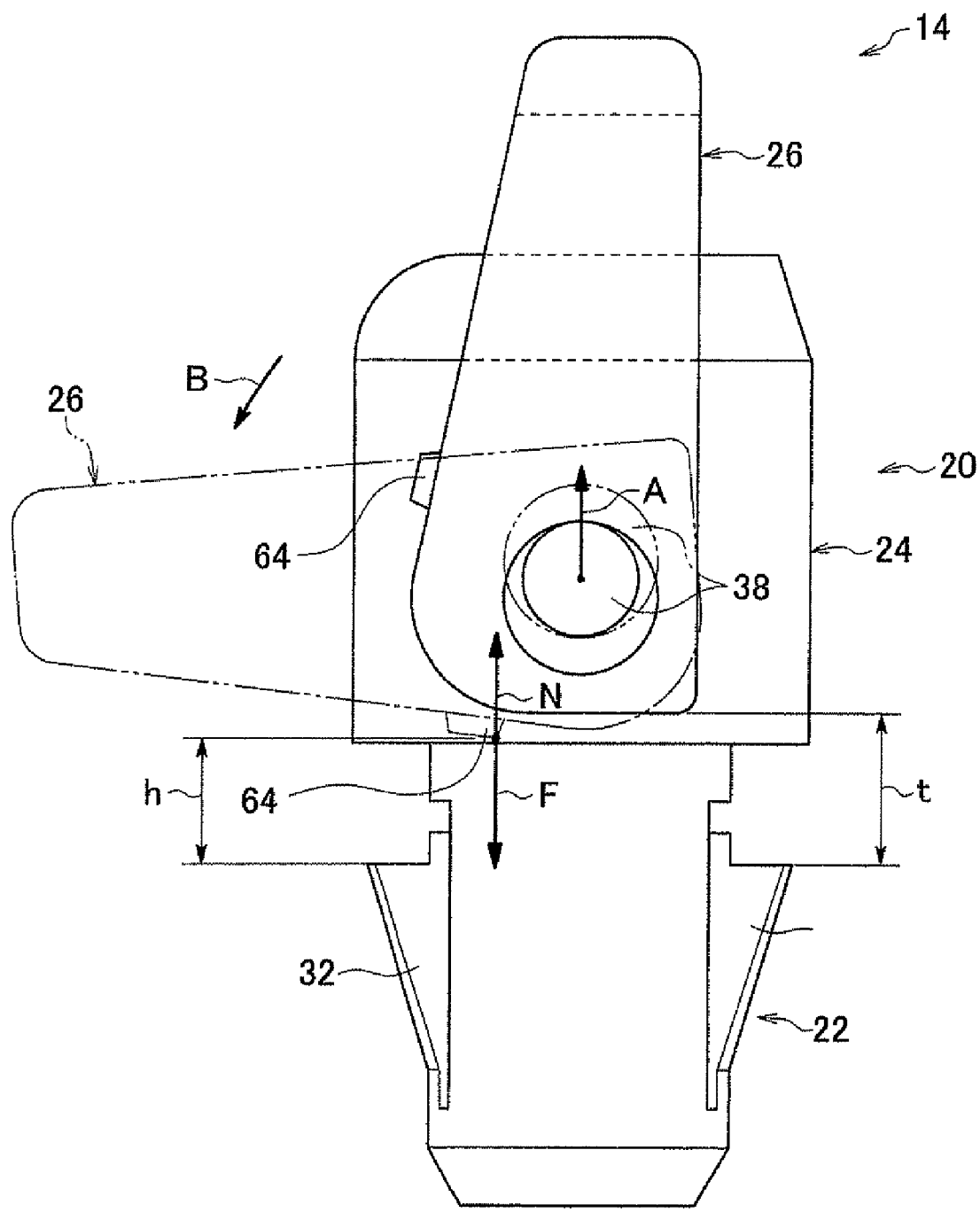
FIG. 10 is an explanatory diagram for showing the operation of a clip according to the first exemplary embodiment of the present invention.

In the state in which the lug portions 32 of the insertion portion 22 have passed through inside the through hole 16 and the operation lever 26 has passed through the fixing hole 18, as shown in FIG. 10 (note FIG. 10 is a schematic diagram for explanation purposes), the distance (h) between the upper faces of the lug portions 32 and the pressing portions 64 of the operation lever 26 is less than the combined thickness (t) of the body panel 10 and the housing 12 (h<t), and a pressing force F from the pressing portions 64 acts on the body panel 10 in the state in which the housing 12 is fixed to the body panel 10.

Reaction force N is therefore generated on the pressing portions 64, and this reaction force N is transmitted to the shafts 38 via the operation lever 26, resulting in a pulling-in force 'A' pulling in the clip 14 toward the body panel 10.

The position of the central axis of the shafts 38 and the positions at which the pressing portions 64 contacts the body panel 10 are displaced in the horizontal direction of the clip 14 (in a direction along the body panel 10), such that the pulling-in force 'A' on the clip 14 and pressing force F due to the pressing portions 64 do not act along the same straight line. A moment about the shafts 38 in the direction of arrow B is thereby generated on the main body portion 20.

The pressing force E consequently further acts on the body panel 10, and the pulling-in force 'A' on the clip 14 increases, increasing the nipping force for the body panel 10 and the housing 12. Fixing of the housing 12 to the body panel 10 can thereby be ensured. By utilizing the pulling-in force 'A' on the clip 14 in such a manner, the clip 14 can be employed in place of a nut and bolt.

In addition, since the clearance between the shafts 38 and the shaft portion 24 varies according to the tilt angle of the operation lever 26, transfer of the pressing force on the clip 14 can be ensured from the shaft portion 24 to the shafts 38 by making the minimum clearance that when the operation lever 26 is in the locked position.

Since the upper faces of the lug portions 32 are formed substantially orthogonal to the axis of the insertion portion 22, when the housing 12 is in a fixed state to the body panel 10, the upper faces of the lug portions 32 are in face-to-face contact with peripheral edge portions of the through hole 16 of the housing 12. Consequently concentrations of force on the upper faces of the lug portions 32 and distortion of the lug portions 32 is prevented.

By use of the clip 14 in this manner, the lug portions 32 are anchored onto peripheral edge portions of the through hole 16, and, simply by tilting the operation lever 26 after the operation lever 26 has passed through the fixing hole 18, the housing 12 can be fixed to the body panel 10 in a fastened state with the clip 14.

Assembly by a one-touch operation of tilting the operation lever 26 is thereby enabled, without a fastening operation using a fastening of the like, and ensuring the housing 12 can be easily fixed to the body panel 10. Since the housing 12 can be fixed to the body panel 10 by the clip 14 alone, a reduction in the number of components is enabled in comparison to conventional configuration, with good operability.

In addition, by extending the lock bar 52 so as to engage within the engagement hole 42 while being inclined at an angle downward toward the rear of the operation lever 26, the lock bar 52 moves within the guide groove 40 in a bent state when the operation lever 26 is tilted. This therefore enables, when the lock bar 52 is engaged with the lock groove 44, the lock bar 52 reverts toward its original shape and a reassuring feeling can be obtained in the operation lever 26 as the lock bar 52 hits a portion at the outer edge of the side walls of the lock groove 44.

If an attempt is made to return the operation lever 26 to the original position from the engaged state of the lock bar 52 with the lock groove 44, a force returning the lock bar 52 to the engaged state from the side wall of the lock groove 44 is generated, and the load retaining the locked state of the lock bar 52 is increased.

Namely, a higher load is required for disengaging the operation lever 26 from the lock groove 44 than the load required for tilting the operation lever 26 from the upright state of the operation lever 26, the clip 14 to be obtained with good operability of the operation lever 26 together with a high resistance to unlocking.

The operation lever 26 is also formed from an elastic member, and the operation lever 26 is inserted within the fixing hole 18 by widthwise compression of the operation lever 26. When the operation lever 26 has passed through the fixing hole 18 the operation lever 26 reverts toward its original shape. In this state, the body panel 10 and the housing 12 are disposed between the operation lever 26 and the lug portions 32 therefore, the clip 14 is prevented from coming out and can be temporarily fixed. It should be noted that this temporarily fixing is also achieved in the state in which the lug portions 32 of the insertion portion 22 have passed through the through hole 16.

In other words, in the clip 14 there is a combination of both mechanisms for temporary and for main fixing, there is hence no requirement for a separate component for temporarily fixing the clip 14, enabling a reduction in the number of configured components and without the use of a fastening. The operation lever 26 may also be passed through the fixing hole 18 before the lug portions 32 of the insertion portion 22 are passed through the through hole 16, enabling prior attachment of the clip 14 to the body panel 10.

Furthermore, by engaging the lock bar 52 of the operation lever 26 with the engagement hole 42 of the shaft portion 24, positioning of the operation lever 26 in an upright state along the axial direction of the main body portion 20 is ensured. The operation lever 26 can consequently be positioned at a specific position, giving simple operation without unintentional tilting of the operation lever 26 when inserting the operation lever 26 through the fixing hole 18.

By forming the lock bar 52 so as to extend out from the free end of the operation lever 26, the rigidity of the free end side of the operation lever 26 can be raised and the operability of the operation lever 26 can be improved.

It should be noted that the shape of the shaft portion 24 is not limited to that described above, as long as the operation lever 26 can be placed upright, and the operation lever 26 can be locked in the tilted state.

Figure 11:
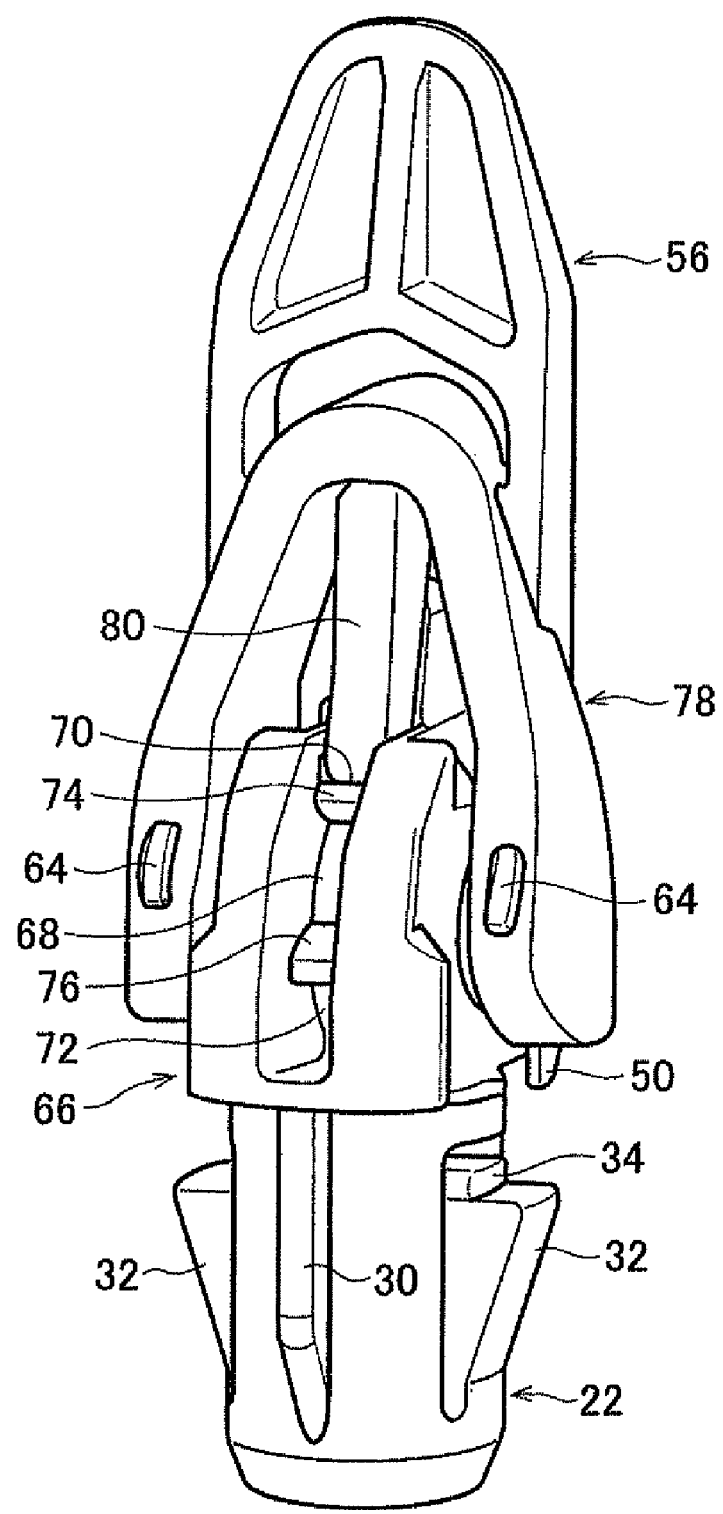
FIG. 11 is a perspective view showing a first exemplary modification of a clip according to the first exemplary embodiment of the present invention.

A suitable configuration is, for example, as shown in FIG. 11, provided with a substantially rectangular column shaped shaft portion 66, a guide groove 68 formed to a central portion in the width direction of the upper face of the shaft portion 66 around to the front wall thereof, an engagement hole (engaged portion) 70 provided in a top end portion of the guide groove 68, and a lock hole (lock groove) 72 provided to a bottom end portion of the guide groove 68. Partitioning ribs 74, 76 are respectively provided to separate the engagement hole 70 and the lock hole 72 from the guide groove 68.

Figure 12:
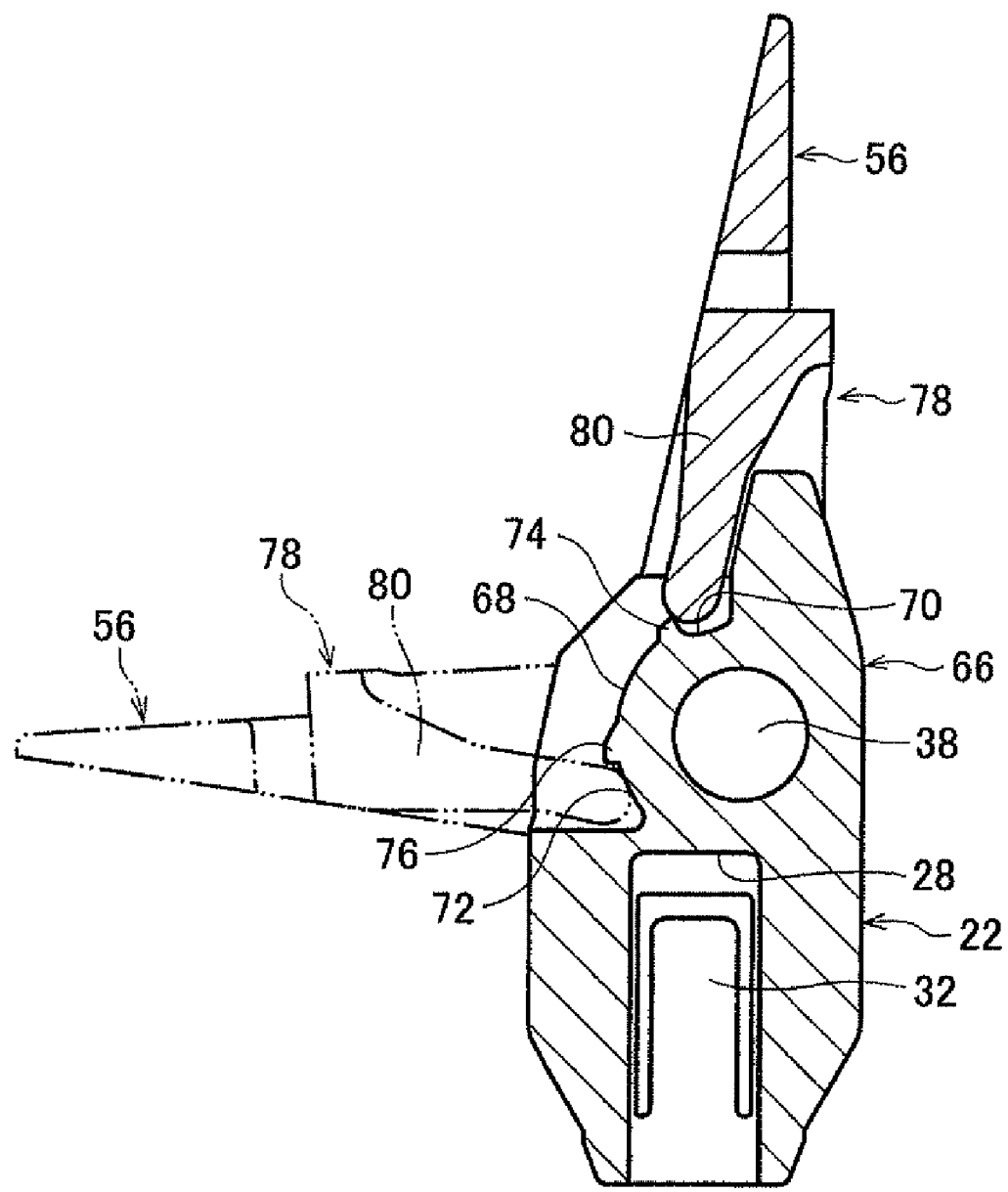
FIG. 12 is a cross-section for explaining the operation of the first exemplary modification of a clip according to the first exemplary embodiment of the present invention.

A lock bar (lock mechanism) 80 of substantially rectangular column shape protrudes down vertically from the inside of the free end portion of an operation lever 78, and the operation lever 78 can be placed upright by engagement of the lock bar 80 with the partitioned engagement hole 70 that is separated from the guide groove 68 by the partitioning rib 74, as shown in FIG. 12 (solid line).

Furthermore, the operation lever 78 is locked by engagement to the lock hole 72 that is separated from the guide groove 68 by the partitioning rib 76 as shown in FIG. 12 (dotted line). Note that, with such a configuration the operability of the operation lever 78 can be modified by changing the angle of the lock bar 80 to the operation lever 78 and the slope of the partitioning ribs 74, 76.

Figure 13:
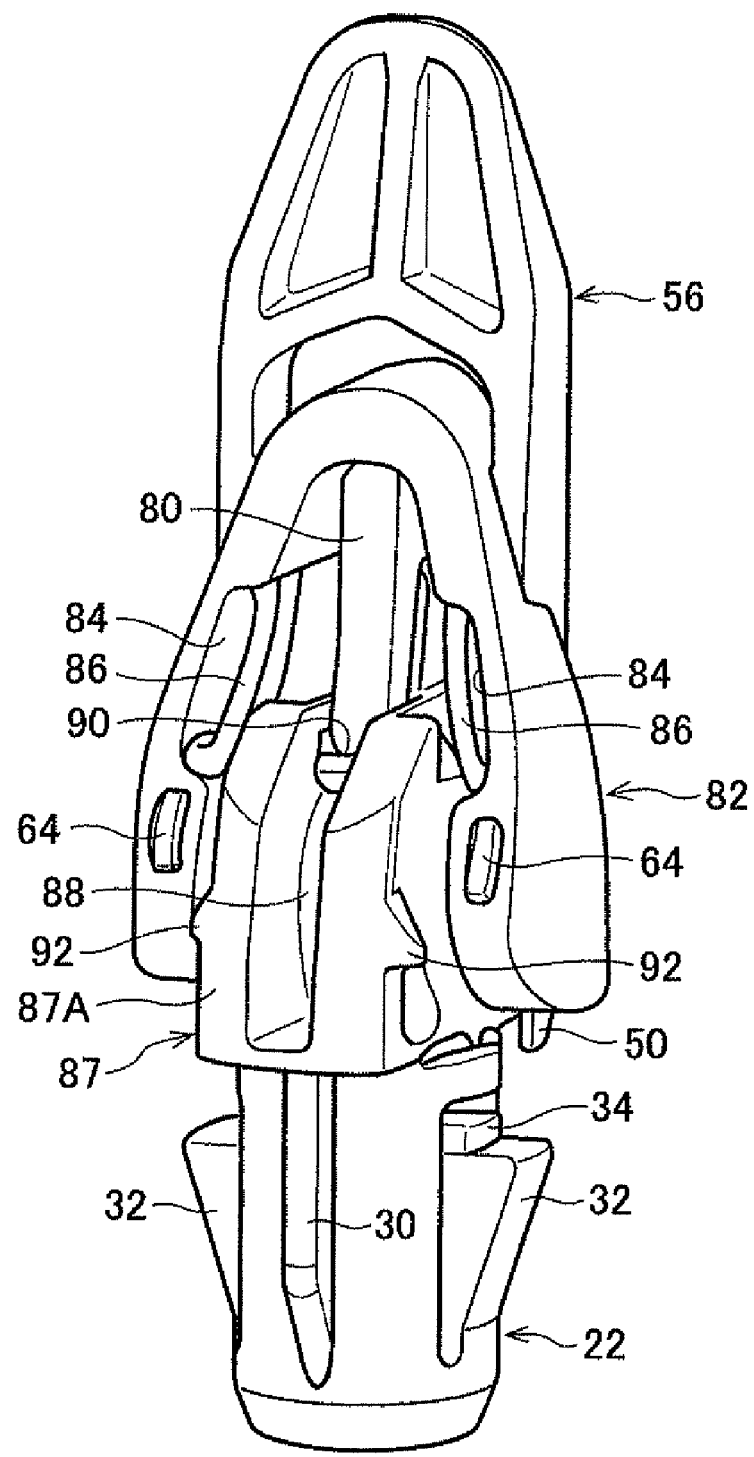
FIG. 13 is a perspective view showing a second exemplary modification of a clip according to the first exemplary embodiment of the present invention.
Figure 14:
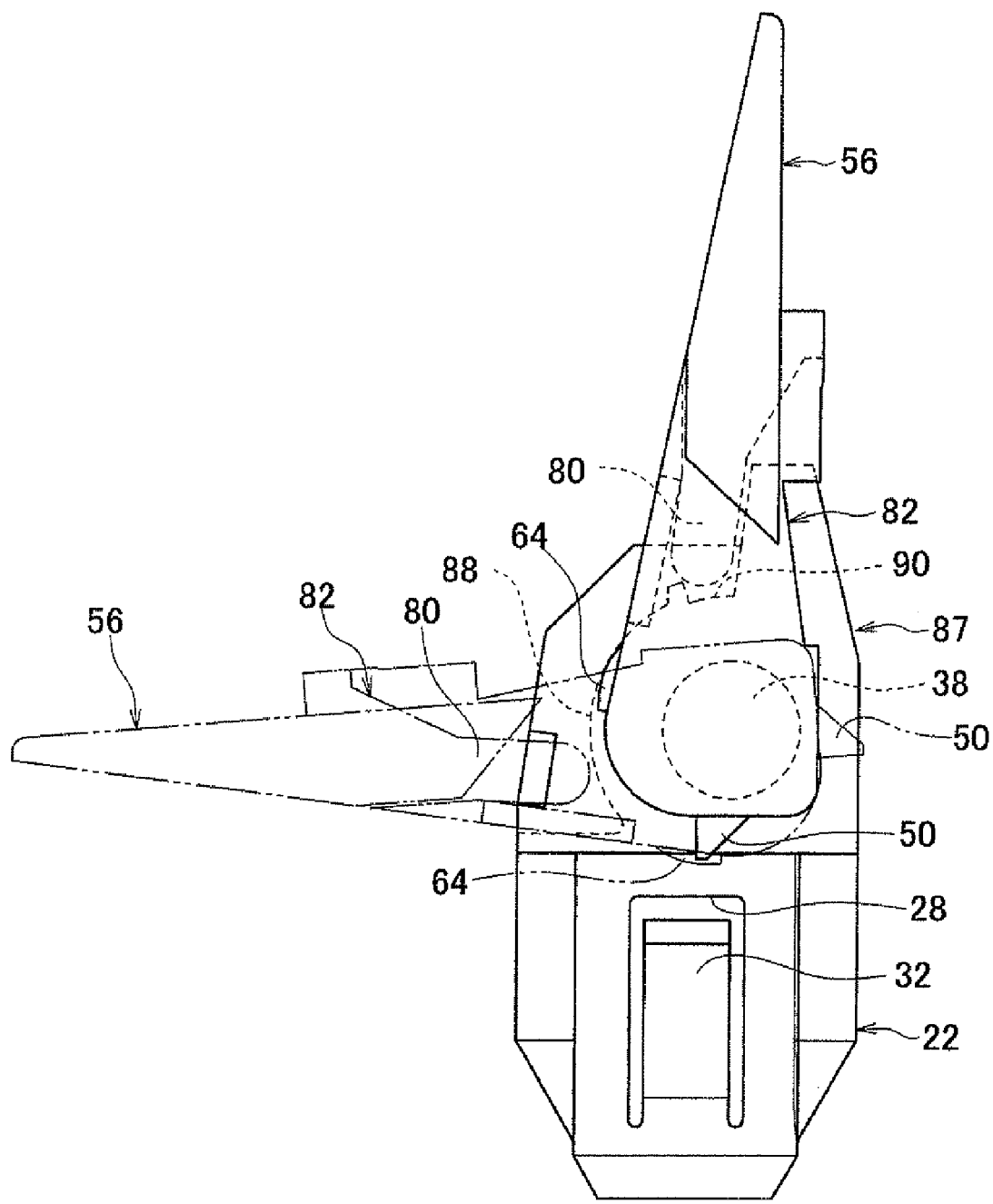
FIG. 14 is a side view for explaining the operation of a clip according to the second exemplary modification of the first exemplary embodiment of the present invention.

Different configuration other than the lock bar 80 may also be used for locking the operation lever 78. A configuration such as, for example, as shown in FIG. 13 and FIG. 14, is suitable, with indentation portions 84 provided at central portions of the inner face of an operation lever 82, the indentation portions 84 having a slightly thinner thickness to the operation lever 82 and extending along the operation lever 82. There are elastic tabs 86 (lock mechanism) provided spanning across both upper and lower side walls of the indentation portions 84 while maintaining gaps with respect to the inside face of the operation lever 82.

A guide groove 88 is provided to a central portion in the width direction of a substantially rectangular column shaped shaft portion 87 from the upper face of the shaft portion 87 around to a front wall 87A thereof, with an engagement hole (engaged portion) 90 provided to a portion at the top end of the groove 88. Anchor lugs (lock mechanism) 92 are provided overhanging from the center of portions at both sides of the front wall 87A of the shaft portion 87, with a bottom face thereof substantially orthogonal to the axis of the shaft portion 87.

The elastic tabs 86 contact the anchor lugs 92 when the operation lever 82 is tilted, and movement of the operation lever 82 is temporarily restricted. However, when the operation lever 82 is pressed further, the elastic tabs 86 elastically deform to the indentation portion 84 side of the operation lever 82, and enabling movement past the anchor lugs 92. The elastic tabs 86 then revert toward their original shape when the elastic tabs 86 have passed the anchor lugs 92, and are anchored by the anchor lugs 92, the operation lever 82 is locked.

Explanation will now be given of a clip according to a second exemplary embodiment of the present invention. Explanation will be omitted for content substantially the same as that of the first exemplary embodiment.

Figure 15:
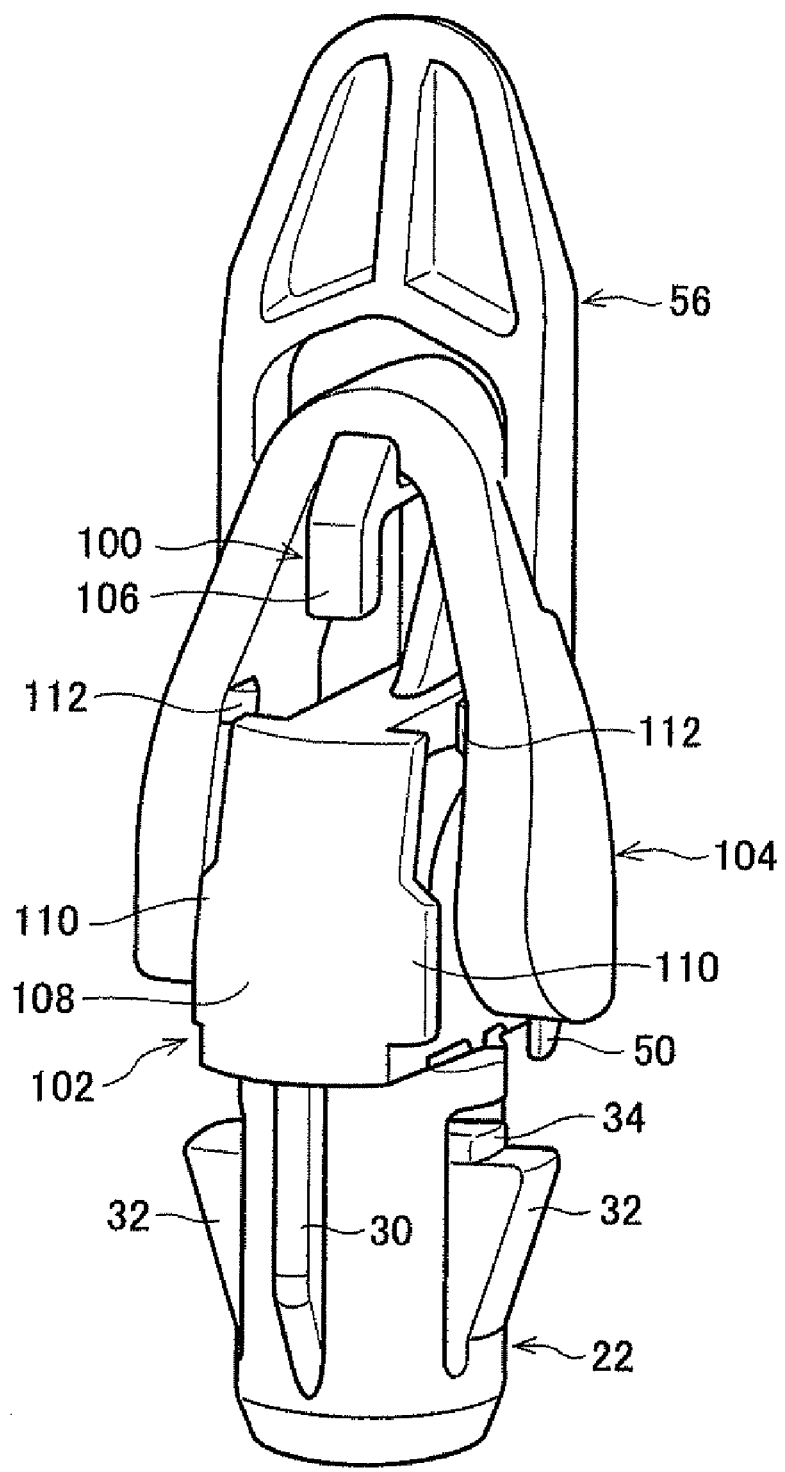
FIG. 15 is a perspective view showing a clip according to a second exemplary embodiment of the present invention.
Figure 16:
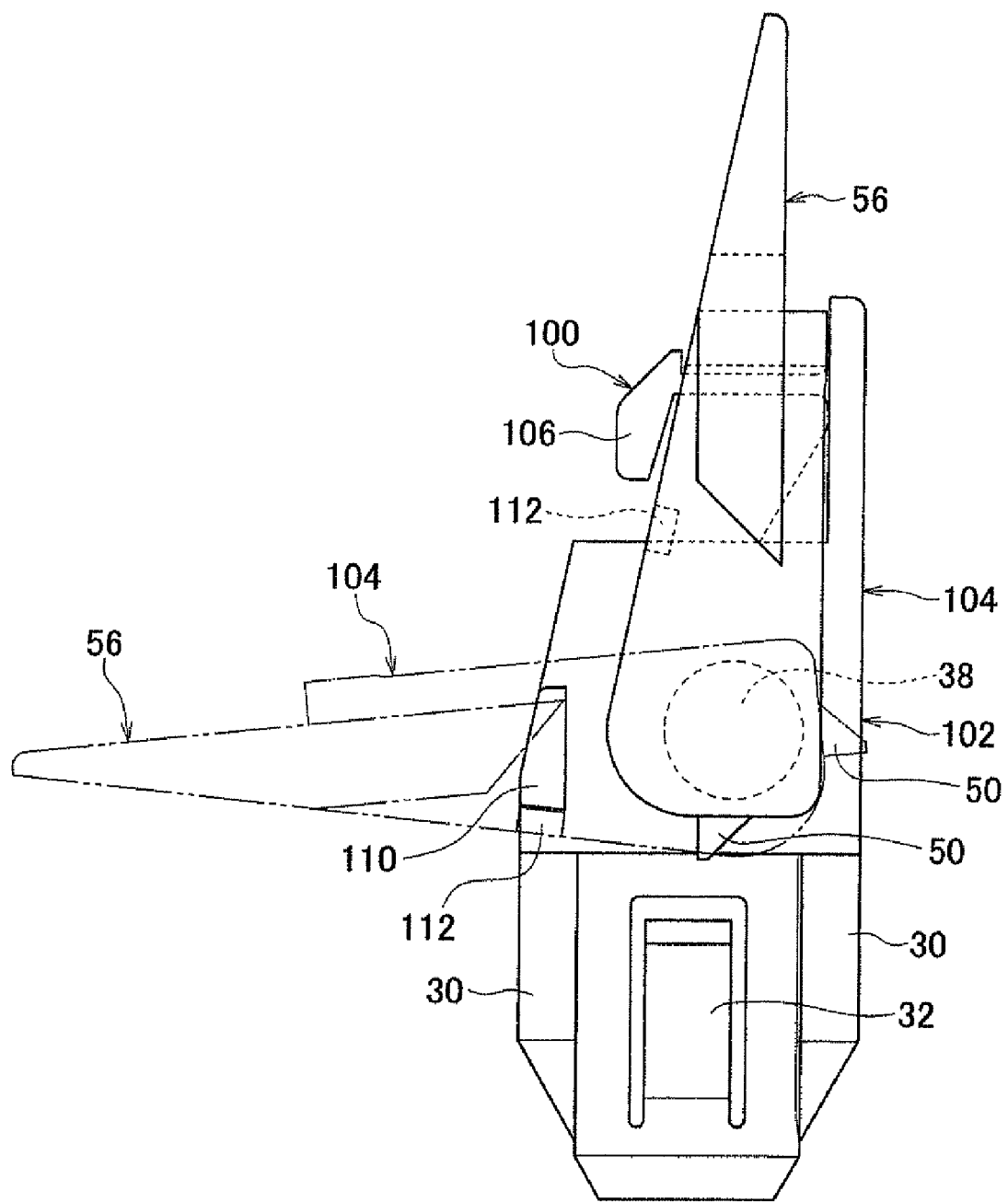
FIG. 16 is side view for explaining the operation of a clip according to the second exemplary embodiment of the present invention.

In the first exemplary embodiment, as shown in FIG. 3, the lock bar 52 is moved along with the operation lever 26, and temporary fixing or main fixing is determined by the position of the lock bar 52. However, as shown in FIG. 15 and FIG. 16, configuration is made here with a support column (engaging portion) 100 fixed to a shaft portion 102 in place of the lock bar 52, and an operation lever 104 is anchored, or unanchored, by the support column 100.

The support column 100 extends up and toward the rear at the upper face of the shaft portion 102, the support column 100 then curves around to along the horizontal direction toward the front side from the shaft portion 102 at a position inside the operation lever 104 when the operation lever 104 is stood upright, and an anchoring portion 106 is formed overhanging top and bottom faces at a distal end portion of the support column 100.

The anchoring portion 106 is contactable with a portion at the free end of the operation lever 104, and configuration is set such that the operation lever 104 is positioned upright along the axial direction of the shaft portion 102 when in a state in which the free end portion of the operation lever 104 contacts the inside face of the anchoring portion 106. Movement of the operation lever 104 is restricted when in the state in which the operation lever 104 contacts the inside face of the anchoring portion 106, maintaining the operation lever 104 in the upright state.

A front wall 108 is provided at the shaft portion 102, and overhang lugs (lock mechanisms) 110 overhang from central portions at both sides of a front wall 108. There are protrusion portions (lock mechanisms) 112 provided at the front surface side of a central portion of the operation lever 104. The protrusion portions 112 contact the overhang lugs 110 when the operation lever 104 is tilted, and the operation lever 104 movement is restricted, however, when the operation lever 104 is pressed further, the operation lever 104 elastically deforms through the protrusion portions 112, and the protrusion portions 112 override the overhang lugs 110.

After the protrusion portions 112 have overridden the overhang lugs 110, the operation lever 104 reverts toward its original shape, and the protrusion portions 112 are anchored by the rear face of the overhang lugs 110. The operation lever 104 is thereby locked.

Since the anchoring portion 106 does not move, the anchoring portion 106 might sometimes affect the locked state of the operation lever 104, however, it suffices that the operation lever 104 can be stood upright and the operation lever 104 can be locked in the tilted state, and no problem arises depending on the attachment position of the clip to the body panel 10.

Explanation will now be given of a clip according to a third exemplary embodiment of the present invention. Explanation will be omitted for content substantially the same as that of the first exemplary embodiment.

In the first exemplary embodiment, as shown in FIG. 3, the guide groove 40 is provided recessed at the center in the width direction of the shaft portion 24 provided at a top portion of the main body portion 20 of the clip 14. The engagement hole 42 is provided recessed at an upper end portion of the guide groove 40, and the lock groove 44 is provided recessed at a lower end portion of the guide groove 40. The lock bar 52 provided to the operation lever 26 moves along the guide groove 40 between the engagement hole 42 and the lock groove 44.

Figure 17:
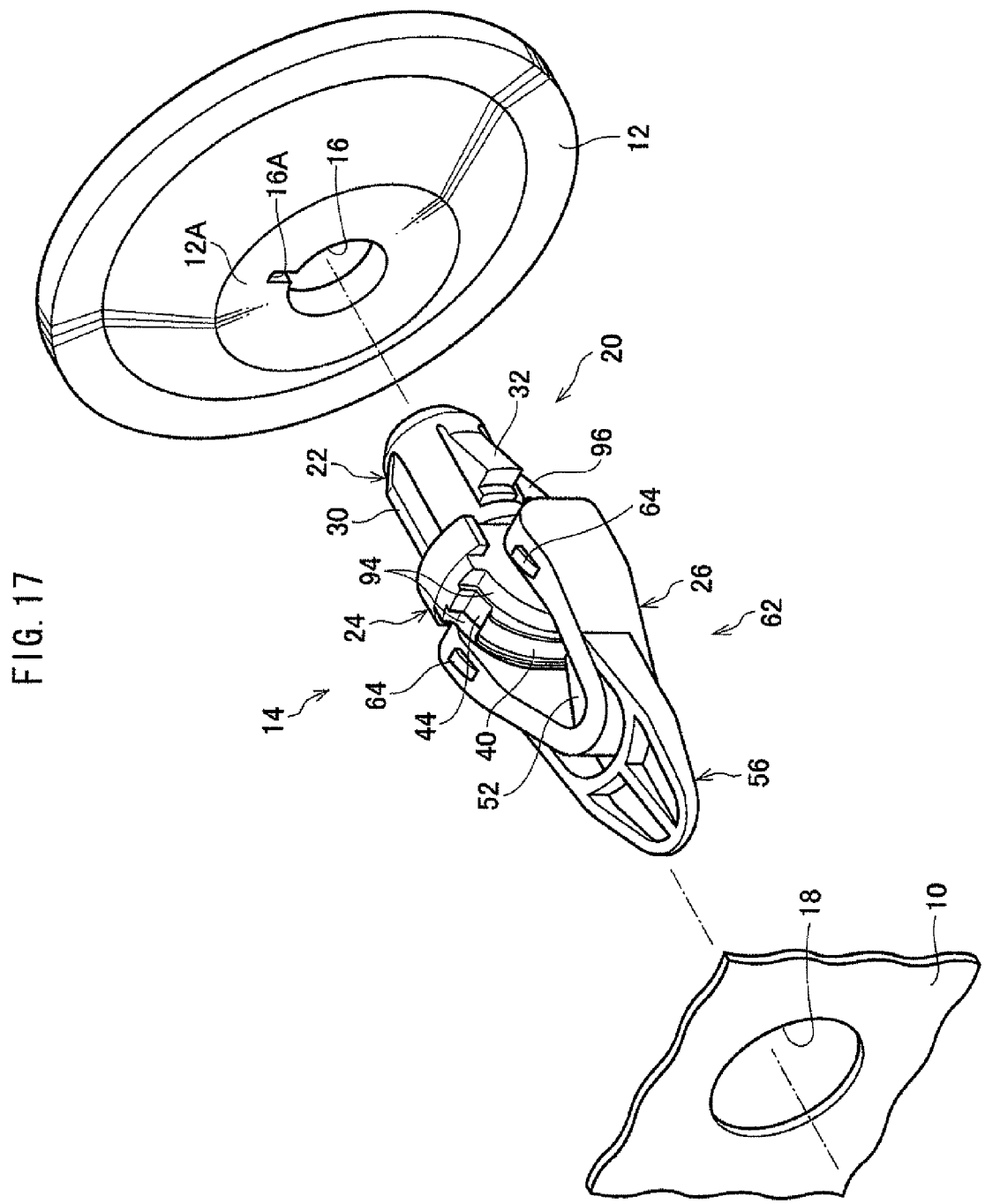
FIG. 17 is an exploded perspective view showing a housing fixing structure employing a clip according to a third exemplary embodiment of the present invention.
Figure 18:
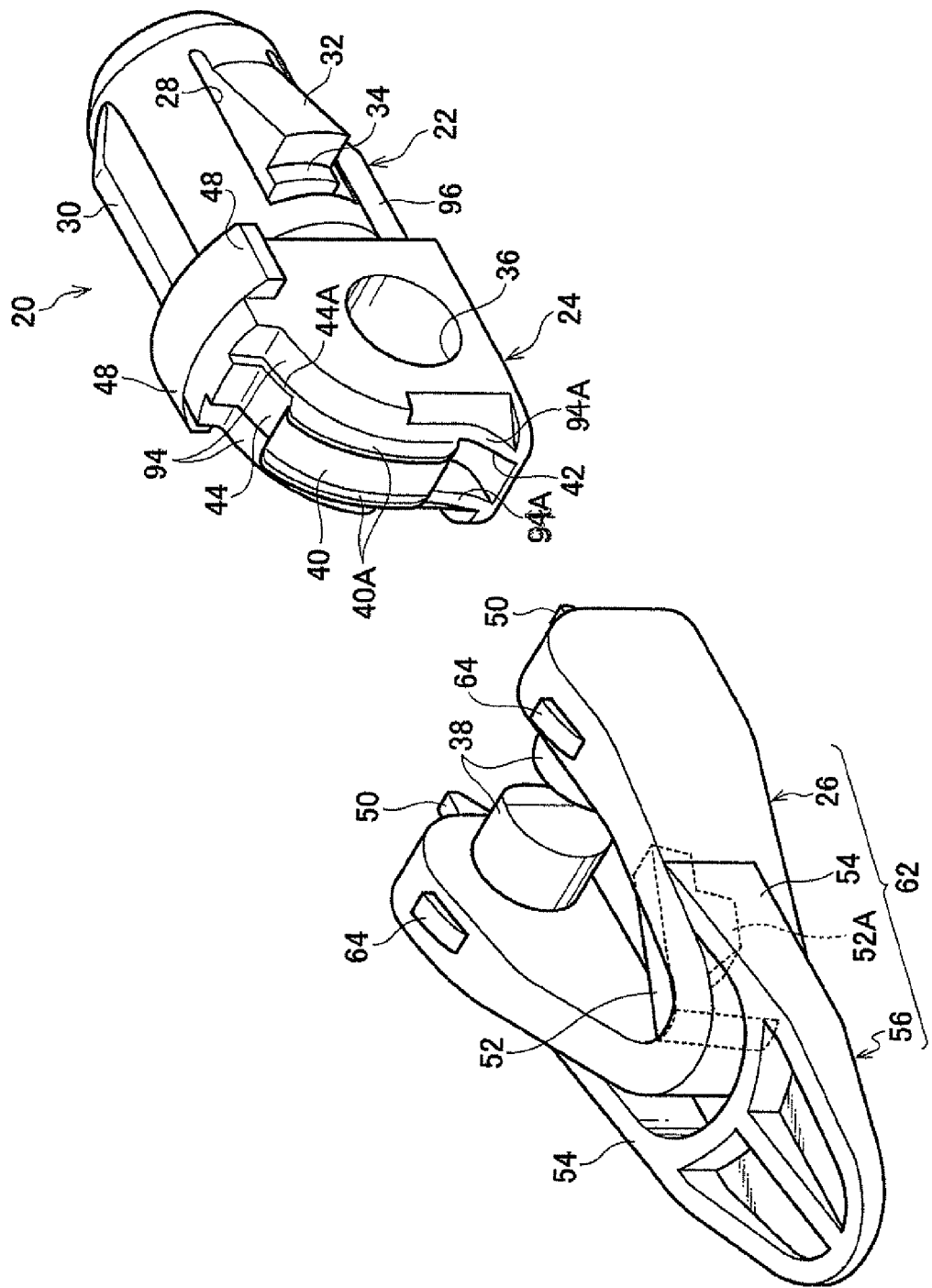
FIG. 18 is an exploded perspective view of a clip according to the third exemplary embodiment of the present invention.
Figure 19:
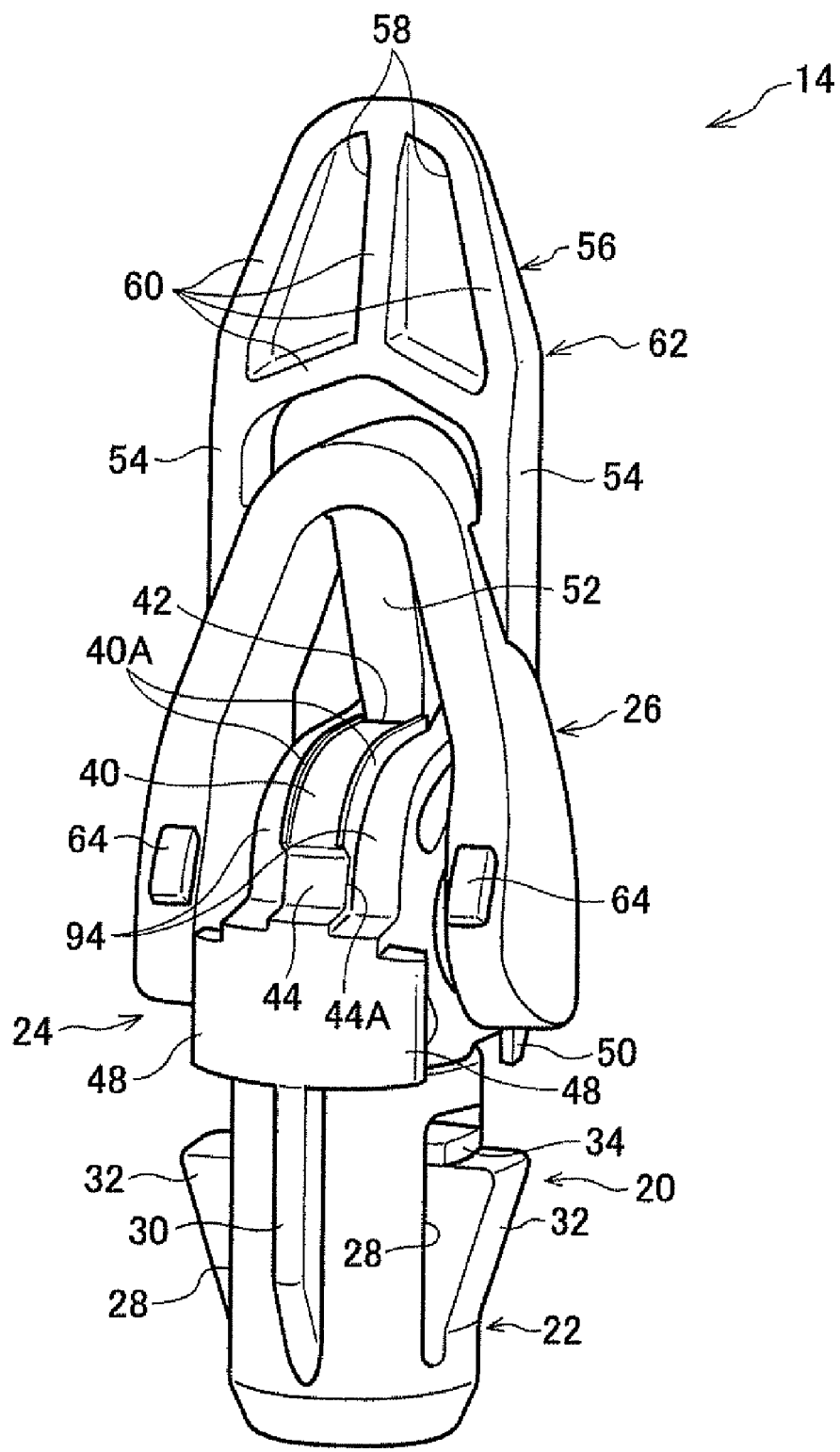
FIG. 19 is a perspective view of a clip according to the third exemplary embodiment of the present invention.

The present exemplary embodiment, as shown in FIG. 17 to FIG. 19, is provided with return grooves 94 connected from the lock groove 44 to the engagement hole 42. The return grooves 94 are at a height so as to form a lower step than the lock groove 44, and, in the same manner as the guide groove 40, the return grooves 94 form a circular arc convex shaped face when viewed from the side and are connected to the engagement hole 42. There are guide faces 94A provided connected to the return grooves 94 at both sides of the engagement hole 42, such that the leading end portion of the lock bar 52 moving in the return grooves 94 is guided smoothly to the engagement hole 42.

The return grooves 94 and the guide groove 40 are separated from each other by side walls 40A of the guide groove 40, such that the leading end portion of the lock bar 52 moving in the guide groove 40 (or in the return grooves 94) is not able to move into the return grooves 94 (or into the guide groove 40).

Figure 20:
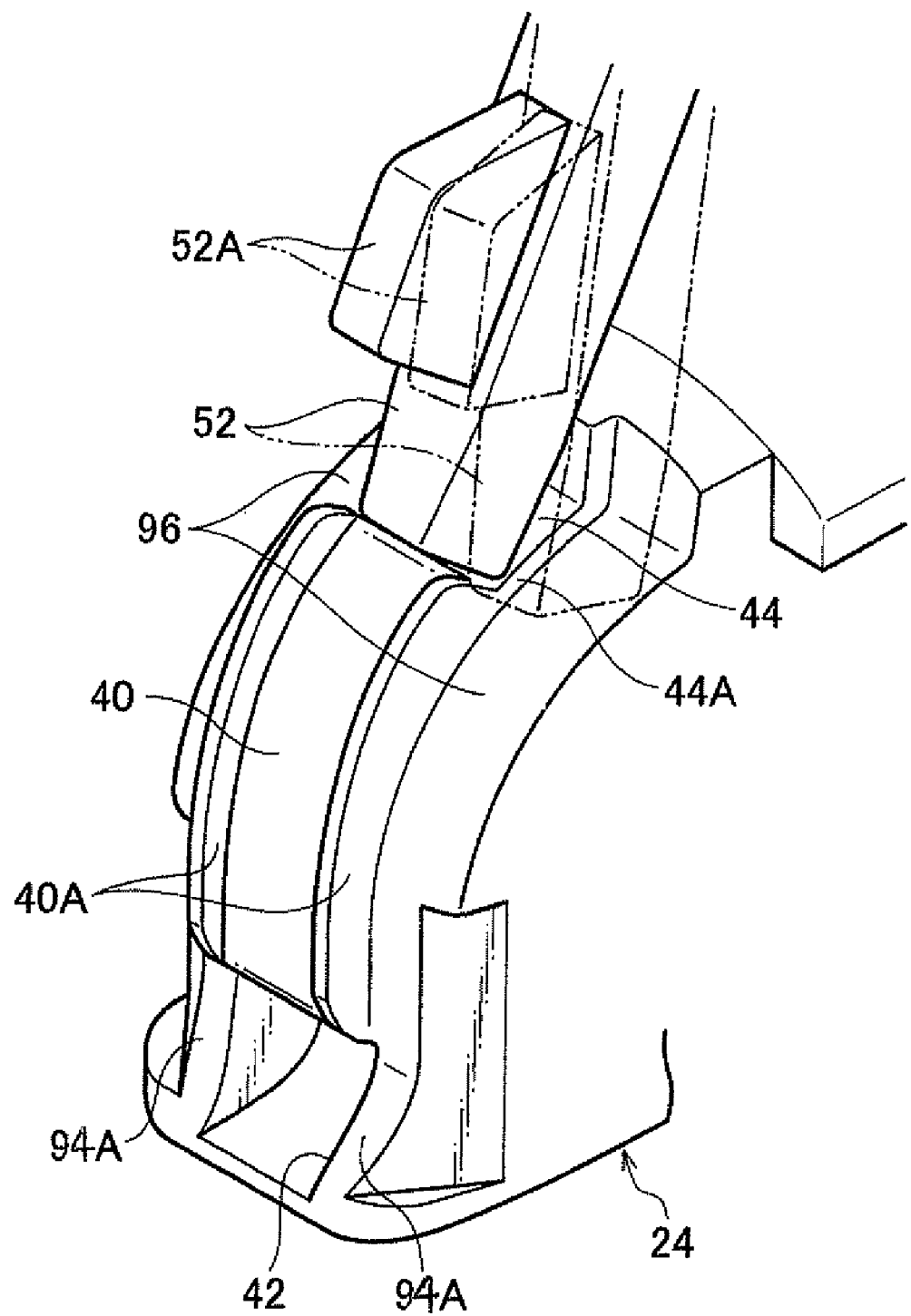
FIG. 20 is a partial expanded perspective view for explaining the operation of a lock bar of a clip according to the third exemplary embodiment of the present invention.

In addition, as shown in FIG. 18 (dotted line) and FIG. 20, there is a protrusion portion 52A provided at the center of the back face of the lock bar 52. The leading end portion of the lock bar 52 can be moved from the lock groove 44 to the return grooves 94 by pressing the protrusion portion 52A in a direction orthogonal (substantially orthogonal) to the tilting direction of the operation lever 26.

The lock bar 52 extends out from the inside of the free end portion of the operation lever 26, and the leading end portion of the lock bar 52 faces the guide groove 40 in the free state of the lock bar 52. Consequently, the lock bar 52 is in a state in which a restoring force is accumulated therein When the lock bar 52 is positioned in one of the return grooves 94.

When the lock bar 52 moved along the return grooves 94 from the lock groove 44 toward the engagement hole 42, the lock bar 52 moves while applying biasing force to sidewalls 44A of the lock groove 44 and to sidewalls 40A of the guide groove 40, but since there is no wall portion restricting movement of the lock bar 52 at the engagement hole 42, the leading end portion of the lock bar 52 is guided into the engagement hole 42 through the guide faces 94A, and engages with the engagement hole 42.

The engagement hole 42 and the lock groove 44 are connected with the guide groove 40, and the return grooves 94 are further provided for the leading end portion of the lock bar 52 to pass through up to the engagement hole 42 in order to release the leading end portion of the lock bar 52 from the locked state in the lock groove 44. Therefore, the leading end portion of the lock bar 52 can be changed between passing along one path (guide groove 40) when the leading end portion of the lock bar 52 is locked in the lock groove 44, and passing along another path (return grooves) when the leading end portion of the lock bar 52 is unlocked from the lock groove 44.

Since the leading end portion of the lock bar 52 is released from the locked state through the return grooves 94, the lock bar 52 does not need to ride over the lock groove 44 to unlock the leading end portion of the lock bar 52 from the lock groove 44. That is, the engagement force exerted when the leading end portion of the lock bar 52 is in the locked state in the lock groove 44, and the engagement release force when the leading end portion is unlocked from the lock groove 44 can be made independent of each other. This therefore enables the engagement force of the leading end portion of the lock bar 52 with the lock groove 44 to be made large, while the engagement release force of the leading end portion of the lock bar 52 from the lock groove 44 is made small.

In the first exemplary embodiment, as shown in FIG. 3, a pair of positioning ribs 30 are formed on the outer peripheral face of the insertion portion 22, the positioning ribs 30 being insertable in the cut-out portions 16A of the through hole 16 and forming a substantially rectangular shape in cross-section. However, in the present exemplary embodiment, as shown in FIG. 17 and FIG. 21, there is a restriction lug 96 provided to the outer peripheral face of the insertion portion 22 at a position on the opposite side thereof to the tilting direction of the operation lever 26 (which is the direction of arrow A), and a positioning rib 30 is provided on the opposite side to that of the restriction lug 96.

The outer face of the restriction lug 96 projects out toward the outside. The cross-section of the restriction lug 96 is formed substantially triangular, and the upper face of the restriction lug 96 is substantially orthogonal to the axial line P of the insertion portion 22. Incision portions 96A formed in a substantially U-shape around the periphery of the restriction lug 96 such that the upper face side of the restriction lug 96 is the free end side, and the restriction lug 96 is radially compressible about the base portion of the restriction lug 96.

Figure 21:
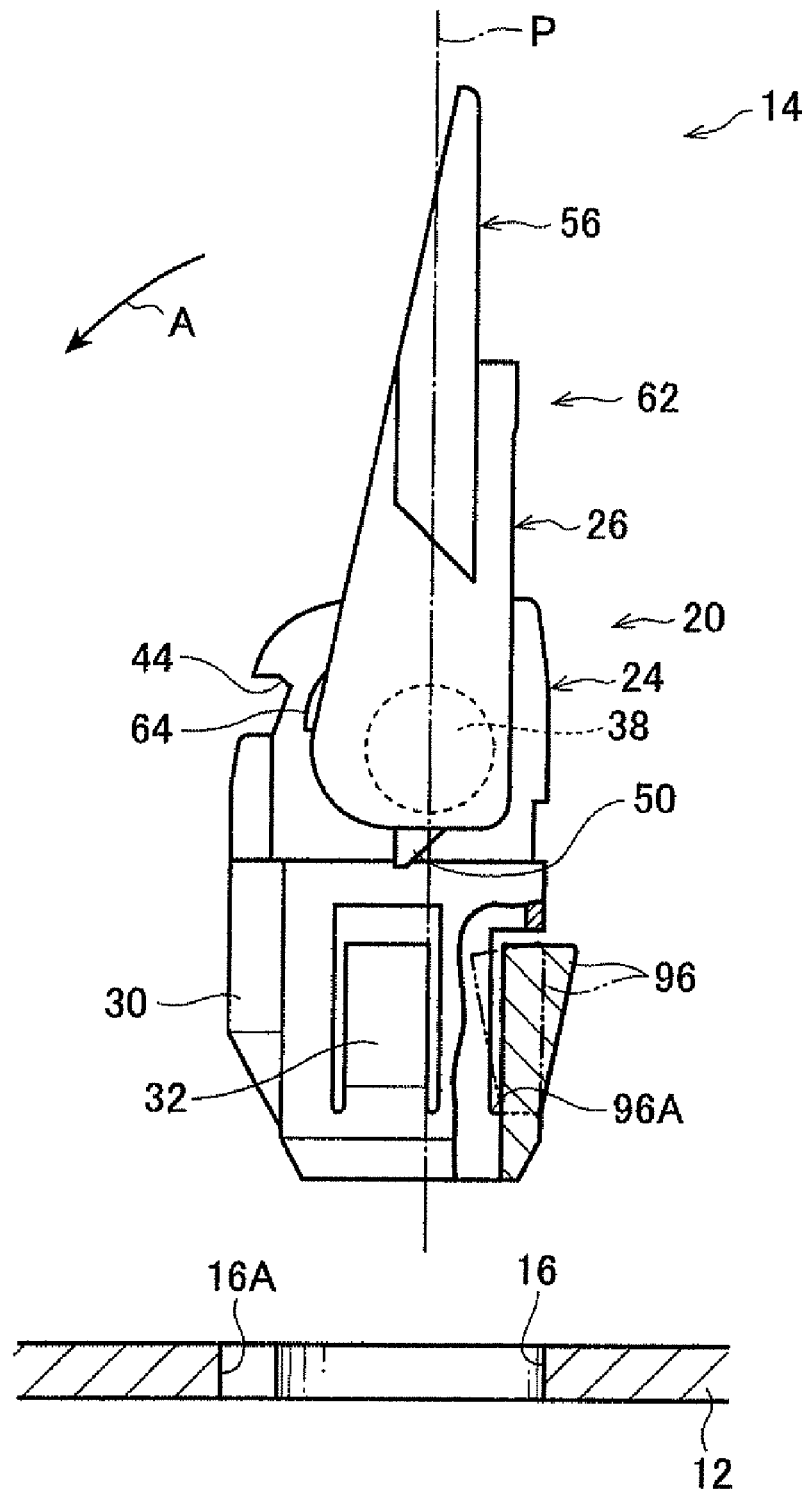
FIG. 21 is a side view of a clip according to the third exemplary embodiment of the present invention, showing a state in which the clip is being inserted into a fixing hole in a body panel.

Therefore, in the temporary fixing process when temporarily fixing the clip 14 to the housing 12, the clip 14 is pressed when in the state shown in FIG. 21, and the lug portions 32 of the insertion portion 22 and the restriction lug 96 are radially compressed by internal edge portions of the through hole 16, the lug portions 32 and the restriction lug 96 are inserted through the through hole 16, and upper faces of the lug portions 32 and the restriction lug 96 contact peripheral edge portions of the through hole 16, as shown in FIG. 22A.

The operation lever 26 is tilted in the state in which the lug portions 32 are anchored onto the peripheral edge portions of the through hole 16, and the operation lever 26 contacts the body panel 10, the operation lever 26 together with the lug portions 32 and the restriction lug 96 nipping the body panel 10 and the housing 12.

As explained for the first exemplary embodiment, with the clip 14, when the housing 12 is in a fixed state to the body panel 10, pressing force F acts pressing the pressing portions 64 toward the body panel 10, reaction force N is therefore generated on the pressing portions 64, and this reaction force N is transmitted to the shafts 38 through the operation lever 26, generates pulling-in force 'A' pulling the clip 14 toward the body panel 10.

Since the pulling-in force 'A' on the clip 14 is not aligned on the same straight line as the pressing force F at the pressing portions 64, a moment is generated in the main body portion 20 about the shafts 38 in the direction of arrow B. There may be a possibility that the clip 14 (the main body portion 20) has tilted relative to the axial line P when the operation lever 26 was tilted so as to nip the body panel 10 and the housing 12. Consequently, the restriction lug 96 is provided in the present exemplary embodiment on the opposite side to that of the tilting direction of the operation lever 26, in order to restrict tilting of the main body portion 20.

When the insertion portion 22 is inserted into the through hole 16, the restriction lug 96 contacts a peripheral edge portion of the through hole 16. Tilting of the main body portion 20 in the direction of arrow B is therefore restricted, and the main body portion 20 does not tilt even when the operation lever 26 is being tilted. Consequently ensuring the locked state of the operation lever 26 can be obtained.

It should be noted that the restriction lug 96 is provided as a separate element to the lug portions 32, however a configuration may be made in which a lug portion 32 serves as a restriction portion by providing the lug portion 32 at opposite side to the extension line in the operation lever 26 turning direction.

Explanation will now be given of an unfixing method for the clip according to the third exemplary embodiment of the present invention.

As explained above, the body panel 10 and the housing 12 are nipped between the upper faces of the lug portions 32 of the insertion portion 22 and the pressing portions 64 of the operation lever 26 by the lock bar 52 shown in FIG. 19 engaging the lock groove 44, fixing the housing 12 to the body panel 10. Explanation will now be given of detaching clip 14 in this state.

First as shown in FIG. 20, the protrusion portion 52A of the lock bar 52 is pressed in a direction orthogonal to the tilting direction of the lock bar 52, the leading end portion of the lock bar 52 is moved to one of the return grooves 94 (shown by the broken lines). The engaged state of the leading end portion of the lock bar 52 to the lock groove 44 is thereby released (tilt state unlocking process).

The operation lever 26 can be turned from this state and the leading end portion of the lock bar 52 moved in the return groove 94. When the leading end portion of the lock bar 52 reaches the guide faces 94A of the return groove 94, the lock bar 52 attempts to return to a central portion of the operation lever 26 due to a restoring force, and engages with the engagement hole 42. The operation lever 26 is thereby in the upright state, as shown in FIG. 22A (operation lever uprighting process).

Next, to pull the operation lever 26 out from the fixing hole 18, the operation lever 26 contacts the peripheral edge portion of the fixing hole 18 and is widthwise compressed. Insertion of the operation lever 26 through the fixing hole 18 of the body panel 10 thereby becomes possible, and the operation lever 26 is pulled out from the fixing hole 18, and the body panel 10 and the housing 12 are pulled apart (operation lever pull-out process). The lug portions 32 of the insertion portion 22 and the restriction lug 96 are then radially compressed, and the clip 14 is detached from the housing 12.

It should be noted that in the present exemplary embodiment there is a pair of lug portions 32 provided on the side faces of the insertion portion 22, these being radially compressed when passing through the through hole 16, and the lug portions 32 anchoring onto peripheral edge portions of the through hole 16 after passing through the through hole 16. However, there is not limitation thereto as long as configuration is made such that the insertion portion 22 does not come out of the through hole 16.

Figure 23:
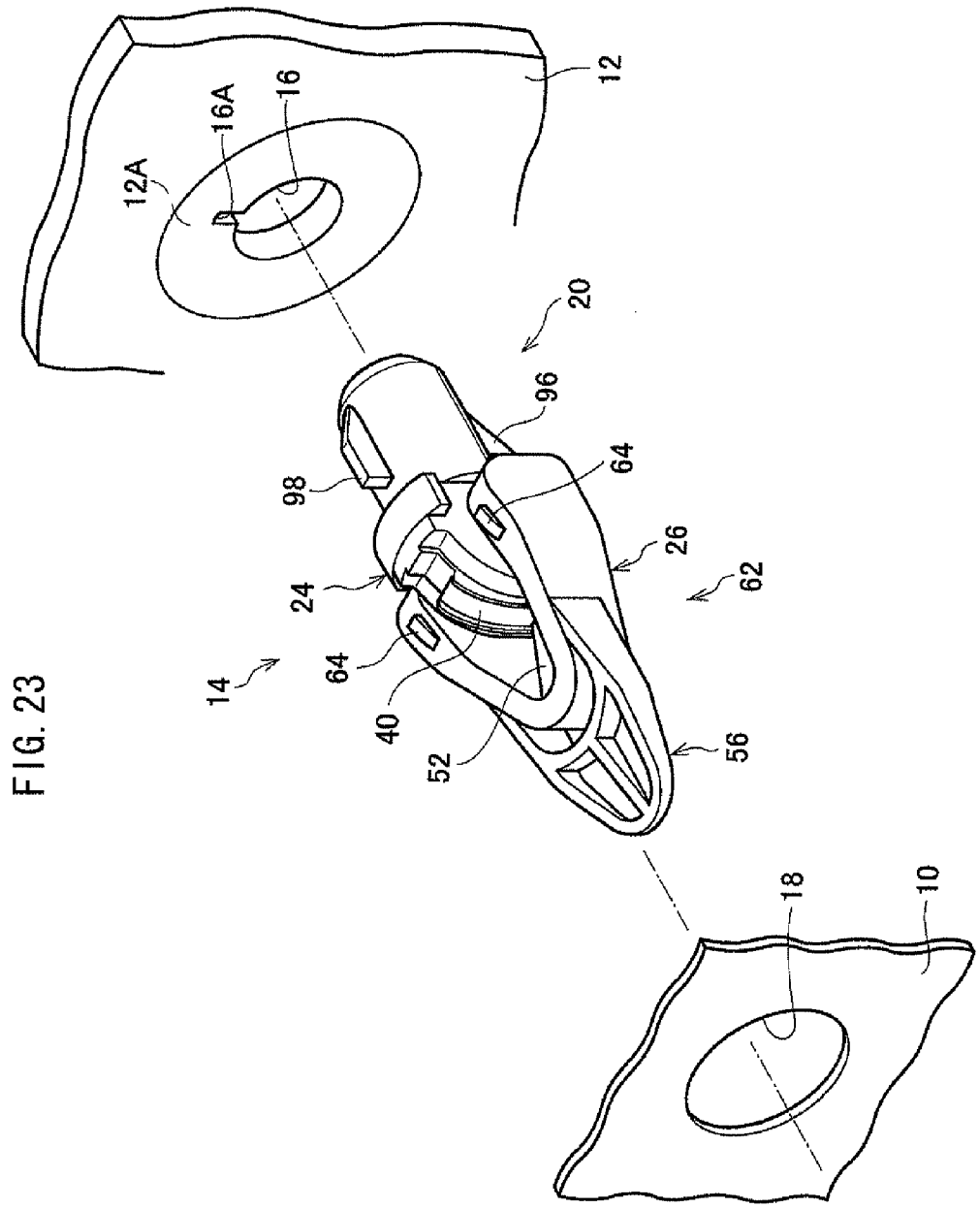
FIG. 23 is an exploded perspective view of a housing fixing structure showing an exemplary modification of a clip according to the third exemplary embodiment of the present invention.

Configuration may be made, for example as shown in FIG. 23, with a restriction lug 96 for restricting tilting of the main body portion 20 provided to the opposite side of the external peripheral face of the insertion portion 22 to that of the operation lever 26 tilting direction, and a retaining rib (retaining portion) 98 provided along the axial direction of the insertion portion 22 on the opposite side to that of the restriction lug 96. Gaps of the wall thickness of the housing 12 are provided between the retaining rib 98 and the shaft portion 24 as well as between the restriction lug 96 and the shaft portion 24.

Then after the restriction lug 96 and the retaining rib 98 have been positionally aligned with a cut-out portion 16A formed in the through hole 16 of the housing 12 and the insertion portion 22 is inserted in the through hole 16, the main body portion 20 is rotated. This rotation is performed so that the position of the retaining rib 98 does not align with the position of the cut-out portion 16A. The retaining rib 98 and the restriction lug 96 are thereby opposed face-to-face with peripheral edge portions of the through hole 16, and are prevented from coming out by the peripheral edge portions of the through hole 16.

There is therefore no need to provide elastic deformation portions like the lug portions 32 to the insertion portion 22. The retaining rib 98 and the restriction lug 96 have been provided here as separate bodies, however the restriction lug 96 may also serve as a retaining portion.

In addition, in the above the retaining rib 98 is formed along the axial direction of the insertion portion 22, and after the retaining rib 98 have been positionally aligned with the cut-out portion 16A and the insertion portion 22 is inserted in the through hole 16, the main body portion 20 is rotated, so as to prevent the retaining rib 98 from falling out, however there is no limitation to such a configuration.

Configuration has be made with the retaining rib 98 formed along the axial direction of the insertion portion 22, however, for example, a retaining portion (not illustrated) may be formed so as to intersect with the axial direction of the insertion portion 22 (either in a straight or curved shape), so that when the insertion portion 22 is being inserted, the insertion portion 22 is inserted into the through hole 16 along the shape of the retaining portion. This thereby removes the requirement to rotate the main body portion 20 after inserting the insertion portion 22 in the through hole 16.

In addition the retaining rib 98 is provided to the insertion portion 22 in the above, however, as long as a configuration is made that prevents the insertion portion 22 from coming out, a groove portion (not illustrated) may be formed in the insertion portion 22 and a flange portion provided to the through hole 16 so as to be insertable in the groove portion.

Figure 24:
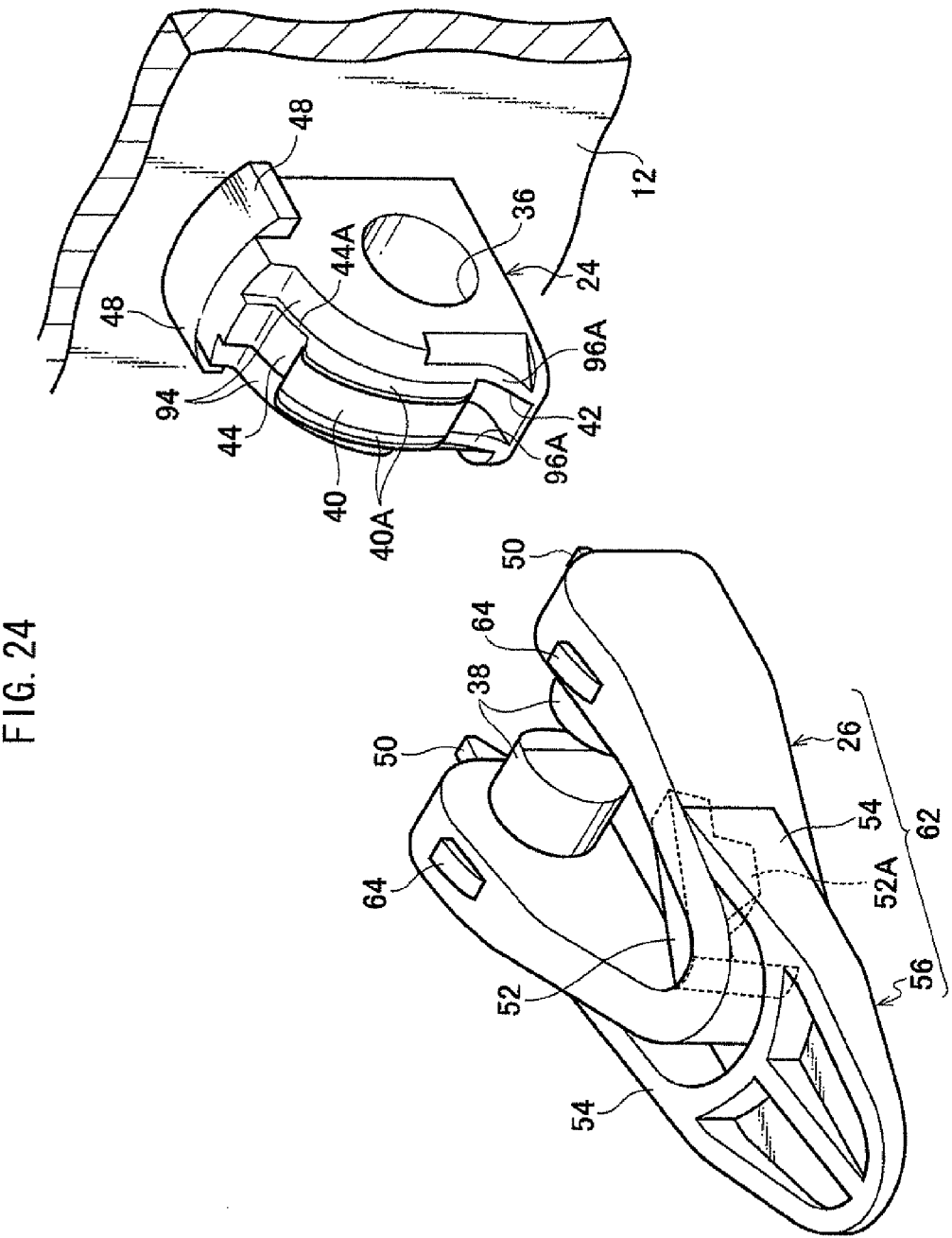
FIG. 24 is an exploded perspective view of a housing fixing structure showing an exemplary modification of a housing and a clip according to the third exemplary embodiment of the present invention.

Also, in the above exemplary embodiment the insertion portion 22 is provided to the main body portion 20, however this insertion portion 22 is not always necessary. Configuration may be made, for example, the main body portion 20, to which the operation lever 26 is attached, directly provided to the housing 12, as shown in FIG. 24. The main body portion 20 may be integrally formed to the housing 12 in this manner, or the main body portion 20 may be fixed to the housing 12 with a non-illustrated fixing mechanism. The main body portion 20 is provided here to the housing 12, however, the main body portion 20 may also be provided on the body panel 10 side.

Explanation will now be given of a clip according to a fourth exemplary embodiment of the present invention. Explanation will be omitted for content substantially the same as that of the first exemplary embodiment.

In the first exemplary embodiment, as shown in FIG. 2, the clip 14 is configured with two portions, the main body portion 20 and the operation lever 26, however, in the present exemplary embodiment a clip 113 includes a main body portion 114 and an operation lever 116 configured as a single component.

Figure 25:
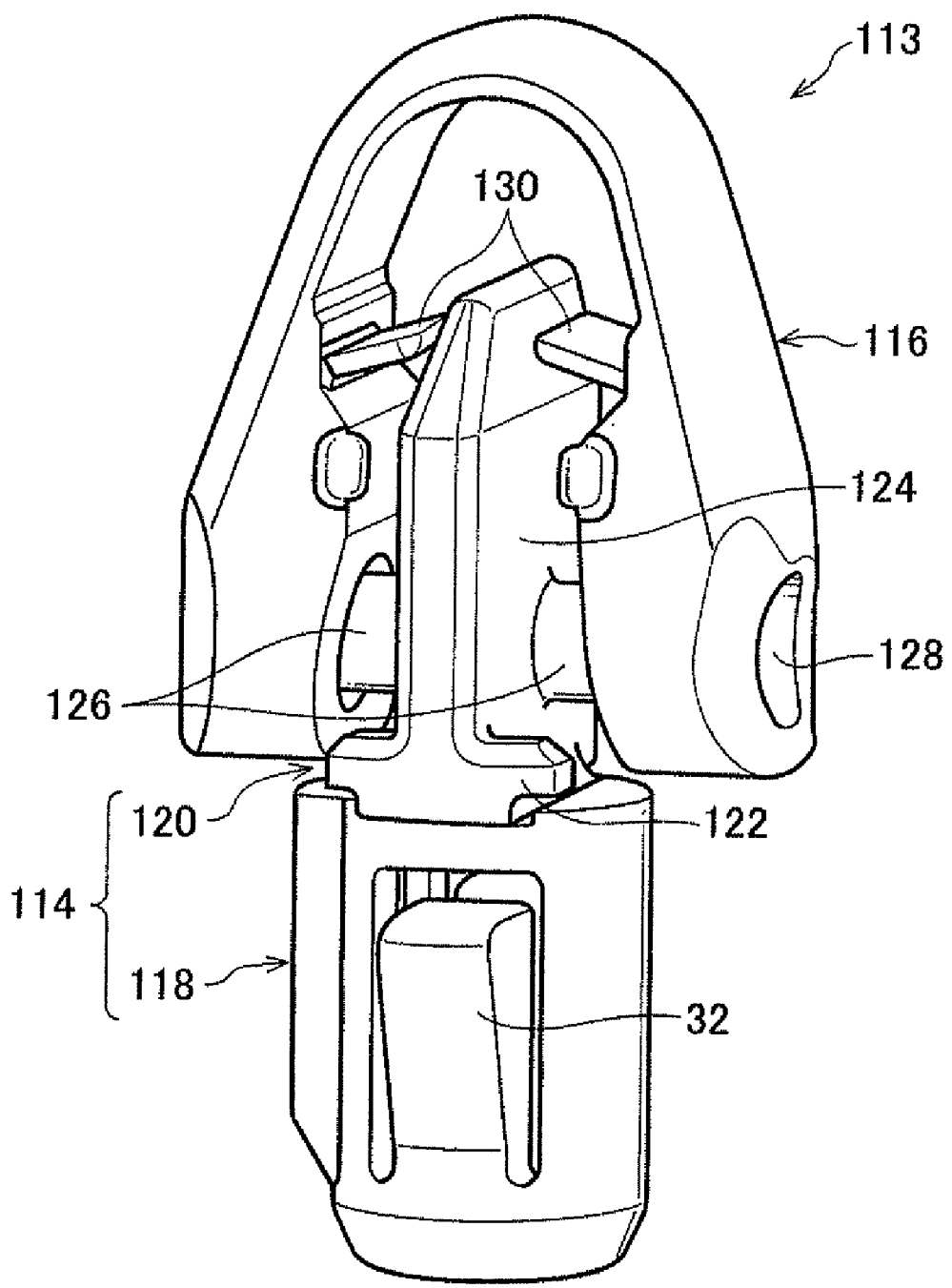
FIG. 25 is a perspective view showing a clip according to a fourth exemplary embodiment of the present invention.

As shown in FIG. 25, the main body portion 114 is configured to include an insertion portion 118 and a shaft potion 120, with the shaft potion 120 forming substantially an inverted T-shape. A head portion 122 of the shaft potion 120 for connecting to the insertion portion 118 is made narrower in width than the insertion portion 118, and a leg portion 124 of the shaft potion 120 is made even narrower Shafts 126 protrude out respectively from the outside surface of the leg portion 124, at the head portion 122 side of the shaft potion 120. An operation lever 116 is formed to the shafts 126, of substantially U-shape and capable of tilting. Shaft holes 128 are provided through both side portions of the operation lever 116, passing through from the inner face to the outer face of the operation lever 116.

The shafts 126 are inserted through the shaft holes 128, making the operation lever 116 capable of tilting. There are gaps provided in this state between the inner face of the operation lever 116 and the leg portion 124 of the shaft potion 120. The operation lever 116 is formed from a resin, and since the resin is elastically deformable, the operation lever 116 is capable of widthwise compression due to the gaps being provided.

Centering ribs 130 are also provided at a central portion on the inside face of the operation lever 116, jutting out toward an end portion of the leg portion 124. There are gaps provided between the centering ribs 130 and the leg portion 124 making the operation lever 116 capable of widthwise compression. When the centering ribs 130 contact the leg portion 124, skewing of the clip 113 is suppressed.

Since the main body portion 114 and the operation lever 116 are configured as a single component, and since the operation lever 116 is to tilt relative to the shaft potion 120, a mold is inserted and maintained between the shafts 126 and the shaft holes 128 of the operation lever 116 when closing the mold in the molding process.

The wall thickness of the mold should be 0.5 mm or above, in consideration of the strength and durability of the mold. Therefore a gap of 0.5 mm or above is generated between the shafts 126 and the shaft holes 128, and there is play between the two of this amount.

However, since molding is made with a single mold even though the configuration is one for two components, this enables a reduction in both the number of assembly processes and mold cost, enabling a reduction in cost to be achieved.

It should be noted that the above exemplary embodiment are obviously only examples, and changes and modification may be made without departing from the spirit of the present invention. The scope of the present invention is therefore not limited to the specific examples described above.

What is claimed is:

1. A fixing for fixing a fixing object to a fixing member by insertion of the fixing into a fixing hole formed in the fixing member and into a fixing object hole formed in the fixing object, the fixing comprising:
   a main body portion to be inserted into the fixing hole and into the fixing object hole;
   an anchoring portion, formed jutting out from a side face at one end side of the main body portion, inserted through the fixing object hole by radial compression, reverting toward its original shape after passing through the fixing object hole and anchoring onto a peripheral edge portion of the fixing object hole;
   an operation lever, attached to the other end of the main body portion so as to be capable of tilting, tilting over in a state in which the anchoring portion is anchored onto the peripheral edge portion of the fixing object hole, contacting the fixing member and nipping the fixing member and the fixing object with the anchoring portion; and
   a lock mechanism that maintains a tilted state of the operation lever, wherein
   the operation lever is formed from an elastic member, is widthwise compressed and inserted into the fixing hole or the fixing object hole and reverts toward its original shape after passing through the fixing hole or the fixing object hole.

2. The fixing of claim 1, wherein the operation lever forms substantially a U-shape, and the operation lever is made capable of tilting by pins that are provided to both end portions of the operation lever and engage with a shaft hole provided in the main body portion.

3. The fixing of claim 1, wherein a pressing portion is provided to an axial portion of the operation lever for pressing the fixing member in a locked state in which the tilted state of the operation lever is maintained by the lock mechanism.

4. The fixing of claim 1, wherein the lock mechanism is configured comprising:
   an engaging portion provided to the operation lever or to the main body portion; and
   a lock groove provided to the main body portion or to the operation lever, with which the engaging portion engages, and maintaining the tilted state of the operation lever that has been tilted.

5. The fixing of claim 4, wherein the engaging portion is provided to the operation lever, and an engaged portion is provided to the main body portion and engaged by the engaging portion to stand the operation lever upright along the axial direction of the main body portion.

6. The fixing of claim 4, wherein a locked state in which the engaging portion is locked in the lock groove so that the tilted state of the operation lever is maintained is unlocked by the engaging portion moving in a direction intersecting with the tilting direction of the operation lever.

7. The fixing of claim 4, further comprising a return groove connecting the engaged portion and the lock groove, for the engaging portion to pass along from the lock groove up to the engaged portion.

8. The fixing of claim 1, further comprising a centering mechanism provided to the operation lever, the centering mechanism contacting the hole wall of the fixing hole or the fixing object hole when the operation lever is in an upright state, and setting the central position of the main body portion relative to the fixing hole or the fixing object hole.

9. The fixing of claim 1, further comprising a restricting portion, positioned at one end side of the main body portion, contacting the fixing object and restricting tilting of the main body portion in the operation lever tilting direction.

10. A fixing structure of a fixing object for fixing the fixing object to a fixing member, the fixing structure employing the fixing of claim 1.

11. A fixing for fixing a fixing object to a fixing member by insertion of the fixing into a fixing hole formed in the fixing member and into a fixing object hole formed in the fixing object, the fixing comprising:
   a main body portion to be inserted into the fixing hole and into the fixing object hole;
   a retaining portion, provided at a side face at one end side of the main body portion and retained at a peripheral edge portion of the fixing object hole after passing through the fixing object hole;
   an operation lever, attached to the other end of the main body portion so as to be capable of tilting, tilting over in a state in which the retaining portion is retained at the peripheral edge portion of the fixing object hole, contacting the fixing member and nipping the fixing member and the fixing object with the retaining portion; and
   a lock mechanism that maintains a tilted state of the operation lever, wherein
   the operation lever is formed from an elastic member, is widthwise compressed and inserted into the fixing hole or the fixing object hole, and reverts toward its original shape after passing through the fixing hole or the fixing object hole.

12. The fixing of claim 11, the retaining portion is formed as a retaining rib along the direction of insertion of the main body portion into the fixing object hole, wherein the retaining rib is retained by the peripheral edge portion of the fixing object hole by rotation of the main body portion after an end face of the retaining rib has passed a cut-out portion formed to the hole wall of the fixing object hole.

13. The fixing of claim 11, wherein the operation lever forms substantially a U-shape, and the operation lever is made capable of tilting by pins that are provided to both end portions of the operation lever and engage with a shaft hole provided in the main body portion.

14. The fixing of claim 11, wherein a pressing portion is provided to an axial portion of the operation lever for pressing the fixing member in a locked state in which the tilted state of the operation lever is maintained by the lock mechanism.

15. The fixing of claim 11, wherein the lock mechanism is configured comprising:
    an engaging portion provided to the operation lever or to the main body portion; and
    a lock groove provided to the main body portion or to the operation lever, with which the engaging portion engages, and maintaining the tilted state of the operation lever that has been tilted.

16. The fixing of claim 15, wherein the engaging portion is provided to the operation lever, and an engaged portion is provided to the main body portion and engaged by the engaging portion to stand the operation lever upright along the axial direction of the main body portion.

17. The fixing of claim 15, wherein a locked state in which the engaging portion is locked in the lock groove so that the tilted state of the operation lever is maintained is unlocked by the engaging portion moving in a direction intersecting with the tilting direction of the operation lever.

18. The fixing of claim 15, further comprising a return groove connecting the engaged portion and the lock groove, for the engaging portion to pass along from the lock groove up to the engaged portion.

19. The fixing of claim 11, further comprising a centering mechanism provided to the operation lever, the centering mechanism contacting the hole wall of the fixing hole or the fixing object hole when the operation lever is in an upright state, and setting the central position of the main body portion relative to the fixing hole or the fixing object hole.

20. The fixing of claim 11, further comprising a restricting portion, positioned at one end side of the main body portion, contacting the fixing object and restricting tilting of the main body portion in the operation lever tilting direction.

21. The fixing of claim 20, wherein the restricting portion also serves as the retaining portion.

22. A fixing structure of a fixing object for fixing the fixing object to a fixing member, the fixing structure employing the fixing of claim 11.

23. A fixing for fixing a fixing object to a fixing member, the fixing comprising:
    a main body portion provided to the fixing member for insertion into a fixing object hole formed in the fixing object;
    an operation lever, attached to the main body portion so as to be capable of tilting, tilting over and contacting a peripheral edge portion of the fixing object hole, the operation lever and the fixing member nipping the fixing object; and
    a lock mechanism that maintains a tilted state of the operation lever,
    wherein the operation lever is formed from an elastic member, is widthwise compressed and inserted into the fixing object hole and reverts toward its original shape after passing through the fixing object hole.

24. The fixing of claim 23, wherein the operation lever forms substantially a U-shape, and the operation lever is made capable of tilting by pins that are provided to both end portions of the operation lever and engage with a shaft hole provided in the main body portion.

25. The fixing of claim 23, wherein a pressing portion is provided to an axial portion of the operation lever for pressing the fixing object in a locked state in which the tilt state of the operation lever is maintained by the lock mechanism.

26. The fixing of claim 23, wherein the lock mechanism is configured comprising:
    an engaging portion provided to the operation lever or to the main body portion; and
    a lock groove provided to the main body portion or to the operation lever, with which the engaging portion engages, and maintaining the tilted state of the operation lever that has been tilted.

27. The fixing of claim 26, wherein the engaging portion is provided to the operation lever, and an engaged portion is provided to the main body portion and engaged by the engaging portion to stand the operation lever upright along the axial direction of the main body portion.

28. The fixing of claim 26, wherein a locked state in which the engaging portion is locked in the lock groove so that the tilted state of the operation lever is maintained is unlocked by the engaging portion moving in a direction intersecting with the tilting direction of the operation lever.

29. The fixing of claim 26, further comprising a return groove connecting the engaged portion and the lock groove, for the engaging portion to pass along from the lock groove up to the engaged portion.

30. The fixing of claim 23, further comprising a centering mechanism provided to the operation lever, the centering mechanism contacting the hole wall of the fixing hole or the fixing object hole when the operation lever is in an upright state, and setting the central position of the main body portion relative to the fixing hole or the fixing object hole.

31. A fixing structure of a fixing object for fixing the fixing object to a fixing member, the fixing structure employing the fixing of claim 23.

32. A fixing for fixing a fixing object to a fixing member, the fixing comprising:
    a main body portion provided to the fixing object for insertion into a fixing hole formed in the fixing member;
    an operation lever, attached to the main body portion so as to be capable of tilting, tilting over and contacting a peripheral edge portion of the fixing hole, the operation lever and the fixing object nipping the fixing member; and
    a lock mechanism that maintains a tilted state of the operation lever,
    wherein the operation lever is formed from an elastic member, is widthwise compressed and inserted into the fixing hole and reverts toward its original shape after passing through the fixing hole.

33. The fixing of claim 32, wherein the operation lever forms substantially a U-shape, and the operation lever is made capable of tilting by pins that are provided to both end portions of the operation lever and engage with a shaft hole provided in the main body portion.

34. The fixing of claim 32, wherein a pressing portion is provided to an axial portion of the operation lever for pressing the fixing member in a locked state in which the tilting state of the operation lever is maintained by the lock mechanism.

35. The fixing of claim 32, wherein the lock mechanism is configured comprising:
    an engaging portion provided to the operation lever or to the main body portion; and a lock groove provided to the main body portion or to the operation lever, with which the engaging portion engages, and maintaining a tilted state of the operation lever that has been tilted.

36. The fixing of claim 35, wherein the engaging portion is provided to the operation lever, and an engaged portion is provided to the main body portion and engaged by the engaging portion to stand the operation lever upright along the axial direction of the main body portion.

37. The fixing of claim 35, wherein a locked state in which the engaging portion is locked in the lock groove so that the tilted state of the operation lever is maintained is unlocked by the engaging portion moving in a direction intersecting with the tilting direction of the operation lever.

38. The fixing of claim 35, further comprising a return groove connecting the engaged portion and the lock groove, for the engaging portion to pass along from the lock groove up to the engaged portion.

39. The fixing of claim 35, further comprising a centering mechanism provided to the operation lever, the centering mechanism contacting the hole wall of the fixing hole when the operation lever is in an upright state, and setting the central position of the main body portion relative to the fixing hole.

40. A fixing structure of a fixing object for fixing the fixing object to a fixing member, the fixing structure employing the fixing of claim 32.

* * * * *